US012784228B2

(12) United States Patent
Klochkov et al.

(10) Patent No.: US 12,784,228 B2
(45) Date of Patent: Nov. 3, 2026

(54) SEGMENTATION OR CROSS SECTIONS OF HIGH ASPECT RATIO STRUCTURES

(71) Applicant: Carl Zeiss SMT GmbH, Oberkochen (DE)

(72) Inventors: Dmitry Klochkov, Schwäbisch Gmünd (DE); Jens Timo Neumann, Aalen (DE); Thomas Korb, Schwäbisch Gmünd (DE); Eno Töppe, Aalen (DE); Johannes Persch, Etgert (DE); Abhilash Srikantha, Neu-Ulm (DE); Alexander Freytag, Erfurt (DE)

(73) Assignee: Carl Zeiss SMT GmbH, Oberkochen (DE)

( * ) Notice: Subject to any disclaimer, the term of this patent is extended or adjusted under 35 U.S.C. 154(b) by 399 days.

(21) Appl. No.: 18/487,844

(22) Filed: Oct. 16, 2023

(65) Prior Publication Data

US 2024/0087134 A1  Mar. 14, 2024

Related U.S. Application Data

(63) Continuation of application No. PCT/EP2022/057656, filed on Mar. 23, 2022.

(30) Foreign Application Priority Data

Apr. 21, 2021 (DE) ......................... 102021110054.2

(51) Int. Cl.
*G06T 7/149* (2017.01)
*G06T 7/00* (2017.01)

(52) U.S. Cl.
CPC ............ *G06T 7/149* (2017.01); *G06T 7/0004* (2013.01); *G06T 2207/10028* (2013.01);
(Continued)

(58) Field of Classification Search
CPC ......... G06T 7/0004; G06T 2207/30148; G06T 2207/10061; G06T 2207/10056;
(Continued)

(56) References Cited

U.S. PATENT DOCUMENTS

| | | | |
|---|---|---|---|
| 11,132,788 B2 | 9/2021 | Dou et al. | |
| 2009/0296073 A1 | 12/2009 | Wagganer | |

(Continued)

FOREIGN PATENT DOCUMENTS

| | | | | |
|---|---|---|---|---|
| CN | 104885196 A | | 9/2015 | |
| CN | 105234560 A | * | 1/2016 | ............ B23K 26/38 |

(Continued)

OTHER PUBLICATIONS

Neumann, Jens Timo, et al. “3D analysis of high-aspect ratio features in 3D-NAND.” Metrology, Inspection, and Process Control for Microlithography XXXIV. vol. 11325. SPIE, 2020. (Year: 2020).*

(Continued)

*Primary Examiner* — Gregory A Morse
*Assistant Examiner* — Stefano Anthony Dardano
(74) *Attorney, Agent, or Firm* — Fish & Richardson P.C.

(57) ABSTRACT

A method identifies ring structures in pillars of high aspect ratio (HAR) structures. For segmentation of rings, a machine learning-logic is used. A two-step training method for the machine learning logic is described.

17 Claims, 29 Drawing Sheets

(52) U.S. Cl.
CPC ............... *G06T 2207/10061* (2013.01); *G06T 2207/10072* (2013.01); *G06T 2207/30148* (2013.01)

(58) Field of Classification Search
CPC ............. G06T 7/55; G06T 2207/20081; G06T 2207/30204; G06T 7/0006; G06T 7/30; G06T 7/33; G06T 7/60; G06T 17/00; G06T 2200/04; G06T 2200/24; G06T 2207/10016; G06T 2207/10028; G06T 2207/10072; G06T 2207/20076; G06T 2207/20164; G06T 2207/20221; G06T 2207/30168; G06T 2207/30172; G06T 3/40; G06T 5/80; G06T 7/001; G06T 7/11; G06T 7/12; G06T 7/13; G06T 7/136; G06T 7/149; G06T 7/174; G06T 7/35; G06T 7/50; G06T 7/521; G06T 7/62; G06T 7/73; G06T 7/75; G06V 10/764; G06V 10/40; G06V 10/454; G06V 10/772; G06V 20/52; G06V 10/774; G06V 10/82; G06V 20/693; G06V 20/698; G06V 20/70; G06V 2201/03
See application file for complete search history.

(56) References Cited

U.S. PATENT DOCUMENTS

| | | | |
|---|---|---|---|
| 2015/0089337 | A1 | 3/2015 | Grady et al. |
| 2015/0340235 | A1 | 11/2015 | Lee et al. |
| 2019/0251694 | A1 | 8/2019 | Han et al. |
| 2020/0134824 | A1 | 4/2020 | Adiga |
| 2020/0173772 | A1* | 6/2020 | Subrahmanyan ....... H01J 37/28 |
| 2020/0234428 | A1 | 7/2020 | George et al. |
| 2020/0294239 | A1* | 9/2020 | Brada ....................... G06T 7/10 |
| 2021/0182622 | A1* | 6/2021 | Peng ................... G06F 18/2155 |
| 2021/0339743 | A1* | 11/2021 | Shi ....................... G06V 20/588 |
| 2022/0036538 | A1* | 2/2022 | Steiman ............... G06N 3/0464 |
| 2022/0138973 | A1 | 5/2022 | Korb et al. |
| 2022/0148850 | A1 | 5/2022 | Pichumani et al. |
| 2022/0230323 | A1* | 7/2022 | Liba ..................... G06V 10/764 |

FOREIGN PATENT DOCUMENTS

| | | | |
|---|---|---|---|
| CN | 109916935 A | | 6/2019 |
| CN | 202010079085 | * | 2/2020 |
| CN | 111727458 A | | 9/2020 |
| CN | 112215858 A | | 1/2021 |
| JP | A 2011-522420 | | 7/2011 |
| JP | A 2020-035282 | | 3/2020 |
| JP | A 2022-535601 | | 8/2022 |
| JP | A 2022-541342 | | 9/2022 |
| TW | 201838052 A | | 10/2018 |
| TW | 202133213 A | | 9/2021 |
| WO | WO 2020/244795 A1 | | 12/2020 |
| WO | WO 2021/018725 A1 | | 2/2021 |
| WO | WO 2021/083581 A1 | | 5/2021 |

OTHER PUBLICATIONS

Hu, Kai, et al. "Brain tumor segmentation using multi-cascaded convolutional neural networks and conditional random field." IEEE Access 7 (2019): 92615-92629. (Year: 2019).*
Kass et al., "Snakes: Active contour models," International Journal of Computer Vision, Jan. 1988, 1(4):321-331.
Li, "Image Contour Extraction Method based on Computer Technology," 4th National Conference on Electrical, Electronics and Computer Engineering, Dec. 2015, 4 pages.
Office Action in corresponding Chinese Appln. No. 202280029696.3, mailed on Apr. 15, 2025, 11 pages (with English translation).
International Search Report and Written Opinion for corresponding PCT Appl No. PCT/EP2022/057656, dated Aug. 4, 2022.
Neumann, J. T. [ et al.]; 3D analysis of high-aspect ratio features in 3D-NAND. In: Metrology, Inspection, and Process Control for Microlithography XXXIV. International Society for Optics and Photonics, 2020, pp. 113250M-1 to -11. URL: bttps://www.spiedigitallibrary.org/proceedings/Download?urlId=10.1117%2F12.2552006 [accessed online on Jan. 13, 2021].
Chien, J. - C. [ et al.]: Inspection and classification of semiconductor wafer surface defects using CNN deep learning networks. In: Applied Sciences, 2020, 10. Year No. 15, p. 5340 URL: https://www.mdpi.com/2076-3417/10/15/5340/pdf [accessed online on Jan. 13, 2021].
Phua, Charissa, Theng, Lau Bee: Semiconductor Wafer Surface: Automatic Defect Classification with Deep CNN. In: 2020 IEEE Region 10 Conference (TENCON), IEEE, 2020. pp. 714-719. URL: https://iecexplore.ieee.org/stamp/stamp.Jsp?tp=&anumber=9293715 [accessed online on Jan. 14, 2021].
Taiwan Office Action and Search Report, with translation thereof, for corresponding TW Appl No. 111110322, dated Dec. 30, 2022.
German Office Action, with translation thereof, for corresponding DE Appl No. 10 2021 110 054.2, dated Jan. 14, 2022.
U.S. Appl. No. 62/858,470, filed Jun. 7, 2019, entitled "Cross Section Imaging with Improved 3D Volume Image Reconstruction Accuracy".
U.S. Appl. No. 63/059,438, filed Jul. 31, 2020, entitled "Method of Cross-Section Imaging of an Inspection Volumes in Wafer".
U.S. Appl. No. 63/037,847, filed Jun. 11, 2020, entitled "Method of Cross-Section Imaging of an Inspection Volumes in Wafer".
Notification of Grounds for Refusal, with English translation, for corresponding Japanese Appl. No. 2023-564649, dated Oct. 22, 2024.
Search Report in Chinese Appln. No. 202280029696.3, mailed on Sep. 23, 2025, 4 pages (with English translation).

* cited by examiner

SEGMENTATION OR CROSS SECTIONS OF HIGH ASPECT RATIO STRUCTURES

CROSS-REFERENCE TO RELATED APPLICATIONS

The present application is a continuation of, and claims benefit under 35 USC 120 to, international application PCT/EP2022/057656, filed Mar. 23, 2022, which claims benefit under 35 USC 119 of German Application No. 10 2021 110 054.2, filed Apr. 21, 2021. The entire disclosure of each these applications is incorporated by reference herein.

FIELD

The present disclosure relates to a three-dimensional circuit pattern inspection and measurement technique by cross sectioning of integrated circuits. More particularly, the present disclosure relates to a method of obtaining a 3D volume image of a channel or high aspect ratio (HAR) structure within an integrated semiconductor sample and to a corresponding computer program product and a corresponding semiconductor inspection device. The method, computer program product and device can be utilized for quantitative metrology, defect detection, defect review, and inspection of shape or cross section, inclination or trajectory of a channel or HAR structure within an integrated semiconductor sample by using a scanning charged particle microscope.

BACKGROUND

Semiconductor structures are amongst the finest man-made structures and suffer from very few imperfections only. These rare imperfections are the signatures which defect detection or defect review or quantitative metrology devices are looking for.

Fabricated semiconductor structures are based on prior knowledge. For example, in a logic type sample, metal lines are running parallel in metal layers or high aspect ratio (HAR) structures or metal vias run perpendicular to the metal layers. The angle between metal lines in different layers is either 0° or 90°. On the other hand, for VNAND type structures it is known that their cross sections are spherical on average.

Integrated Semiconductors are fabricated by processing a series of layers on a Silicon Substrate by planar integration techniques. Each layer is first planarized and then structured by a pattern within a lithography process by a projection exposure apparatus. The lithography pattern is transferred into the silicon layer by several techniques, including etching, deposition, doping or implantation. A cross section perpendicular to a set of layers is shown in FIGS. 1A-1B. The integrated semiconductor 50 comprises a set of layers 54.1, 54.2, . . . 54.22, which are fabricated by planar integration techniques parallel to the top surface 52, which extends in x-y-direction. Beyond the lowest layer 54.22 is the bulk Silicon substrate 51 of the semiconductor substrate or wafer, which is not shown in its entire depth. The lowest layer 54.22 is a layer in which doped structures 58 in the Silicon substrate are formed by e.g. implantation. On top of this layer, a series of so-called metal layers structured with metal conductors, such as metal layers 54.1, 54.3, . . . 54.17 . . . alternates with a series of isolation layers, such as isolation layers 54.2, 54.4, . . . . The isolation layers comprise interconnects to contact two neighboring metal layers, such as vias 55 between a metal structure 56 in metal layer 54.1 and the metal structure in metal layer 54.3. The lowest metal layer comprises a series of gates 57 with contacts 59 in the adjacent isolation layer.

With increasing depth in z-direction, the minimum feature sizes in the layers usually become smaller. The current minimum feature size or critical dimension in the lowest, sometimes relatively important layers is actually below 10 nm, for example 7 nm or 5 nm, and approaching below 3 nm in near future. With the small extension of the minimum feature sizes, the expectations on the lateral placement of the layers in x- and y-direction can become more and more demanding. The lateral overlay accuracy of two layers typically is in the order of ⅓ of the minimum feature size in the two layers. Thus, it is generally desirable for the lateral alignment of the lowest layers to be on the order of few nm, and in near future possibly even below 1 nm.

FIG. 2 shows another example of a cross section through a semiconductor device, such as a NAND memory device. In this example, several pillars, such as the three pillars indicated by reference number 60, extend through a large set of metal and isolation layers 54.1, . . . 54.*k*, . . . 54.*z*, and establish conducting connections perpendicular to the layers. The pillars 60 are also called HAR (high aspect ratio)—structures, or sometimes contact channels. While metal structures within the metal layers, parallel to the surface 52 are fabricated at once with the high precision of planar fabrication techniques, the pillars 60 are formed by a large series or small metal structures in each subsequent layer, stacked on top of each other. The pillars thus can suffer from several damages, thus as errors in the processing of individual planar layers as well as overlay errors between subsequent planar layers. Errors or defects within the pillars, however, can limit the performance of a semiconductor device or may cause failure of such a device. One kind of pillars are so-called memory channels in 3D memory chips.

Certain known techniques employed to analyze integrated semiconductor devices currently utilize a 2D imaging approach. For example, a thin slice or lamella is formed from the semiconductor device, e.g. by ion beam milling, and the thin sample is extracted by a probe. The lamella can either be a so-called "planar view" or a "cross view"—sample, being either parallel or perpendicular integrated semiconductor device. The lamella is further analyzed by e.g. a scanning electron microscope (SEM or STEM) or by a transmission electron microscope (TEM). This method involves removal of material from both in front and behind the channels or pillars, which can result in imprecise measurements. Portions of the pillar, hole or channel may have been removed from the thin slice and are missing from the imaging lamella.

Another method is the 2D image generation of individual intersection planes either parallel or perpendicular to the integrated semiconductor device, generated by milling and imaging with a Cross Beam or dual beam device. However, HAR Pillars or holes or channels, as described above, are manufactured with shapes that are not always predictable or known. They can take twist and bend and extend outside a planar 2D intersection. 2D techniques can fail to capture the true path or trajectory of these structures, as well as the shape properties of these structures, because the HAR Pillars or holes or channels may not be limited to a planar intersection plane. Next, a cross section surface for 2D imaging can de deteriorated by an effect called curtaining, such that a cross section surface shows some waviness and the 2D image may contain only parts of semiconductor structures.

2D imaging methods often capture only the portion of their shape, where they intersect the imaging surface or thin slice volume.

Recently, 3D volume image generation has been introduced. 3D volume images are generated via a cross sectioning technique, utilizing a charged particle beam system to slice and image an integrated semiconductor to determine a 3D volume image of a predetermined volume within the integrated semiconductor. Such a cross section imaging technique includes the generation and storing of a large set of 2D cross section images, and the registration of the 2D cross sections images within a volume to generate a 3D volume image of high precision. The charged particle system can comprise an electron microscope (SEM) for imaging and a focused ion beam system (FIB) for slicing, or an ion beam system for slicing and imaging.

SUMMARY

It can be challenging to determine errors or defects of pillars or holes or deviations of the structure, including the internal structure of pillars. In particular, memory channels and similar pillars may have an internal sub-structure, for example exhibit several concentric rings in cross-section. Automatically identifying such sub-structures in a manner that allows to determine errors or defects is a challenge.

The present disclosure seeks to provide an improved method of identifying sub-structures in a cross-section of a pillar of HAR structure, for example in the context of obtaining a 3D volume image of a pillar or HAR structure. In some implementations, the method can allow for an accurate 3D reconstruction of a pillar or HAR structure by a series of cross section images.

Embodiments can use a trained machine-learning logic for identifying sub-structures, in particular rings, in a cross-section of a pillar. A first aspect relates to training such a machine learning logic.

According to a first aspect, the disclosure provides a method of training a machine-learning logic for segmentation of rings of pillar cross sections in high aspect ratio, HAR, structures, is provided, the method comprising:

- providing cross section images of a plurality of pillars,
- binary annotating rings in the cross section images with two alternating labels,
- training a first machine learning logic based on the binary annotated rings,
- segmenting the cross section images or further cross section image with the trained first machine-learning logic to provide binary segmented images,
- multi-level annotating segmented rings in the binary segmented images to provide multi-level annotated images, and
- training a second machine learning logic as the machine-learning logic for segmentation of rings based on the multi-level annotated images.

By using such a two-step training process with a first machine-learning logic and a second machine learning logic, training may be improved or facilitated. A machine learning logic, as used herein, refers to an entity that classifies and performs a segmentation on objects, in this case identifies the various parts of the ring, based on machine learning techniques, sometimes also referred to as artificial intelligence (AI). A machine learning logic is sometimes also referred to as a model. Segmentation generally refers to identifying separate parts of an object (in this case e.g. rings), so that the parts may be used for further analysis or other processing. Examples for a machine learning logic may for example include decision trees, vector machines or various type of neural networks like deep neural networks, adversarial networks or the like.

In some embodiments, the first machine learning logic may be a less complex model than the second machine learning logic. For example, the first machine learning logic can include a random forest model, and/or the second machine learning logic may include a neural network.

In an embodiment, the method may further comprise re-training the first machine learning logic based on corrected binary segmented images, to improve the training.

In an embodiment, training the second machine learning logic may be based on a first part of the multi-level annotated images, and wherein the method further comprises testing the trained second machine learning logic based on a second part of the multi-level annotated images different from the first part.

According to a second aspect, the disclosure provides a method of analyzing rings of pillar cross sections in high aspect ratio, HAR, structures, is provided, the method comprising:

- providing a cross-section image of a pillar,
- segmenting rings in the cross-section using a trained machine learning logic, and
- determining parameters of the rings based on the segmented rings.

In this way, an internal structure of a pillar, for example a memory channel, may be analyzed.

The machine-learning logic is the second machine learning logic trained with the method of the first aspect.

In an embodiment, the method may further comprise identifying contours of the rings based on the segmented rings, wherein determining the parameters is based on the identified contours.

In an embodiment, the parameters may include parameters selected from the group consisting of ring radii and ring diameters.

In an embodiment, the method may further comprise identifying deviations of the parameters from nominal or intended values.

Techniques as discussed herein may be embedded in or used in a method for high precision, 3D reconstruction of 3D volume images or 3D shapes of HAR structures by cross sectioning of the integrated circuits and, more particularly, a method, computer program product and apparatus for obtaining 3D volume images of an HAR structure.

For example, in an embodiment the method may further comprise:

- obtaining a 3D tomographic image of a semiconductor sample,
- selecting a subset of 2D cross section image segments including the cross-section image of the pillar from the 3D tomographic image, each comprising cross section images of a set of HAR structures,
- identification of a contour of each HAR structures within the set of HAR structures in the subset of 2D cross section images,
- extraction of deviation parameters from the contours of the HAR structures of the set of HAR structures,
- analyzing the deviation parameters,
- wherein the derivation parameters comprise one or more of a displacement from an ideal position, a deviation in radius or diameter, a deviation from a cross section area, and a deviation from a shape of a cross section.

The step of analyzing the deviation parameters in an embodiment may comprise performing statistical analysis of at least one deviation parameter of at least one HAR structure of the set of HAR structures.

The method can allow for quantitative metrology of diameters and shapes of cross sections of HAR structures, as well as the determination of trajectories of HAR structures within the integrated circuits. Furthermore, the disclosure provides a method, computer program product and apparatus for a determination of a channel trajectory through an integrated semiconductor device, and the determination of the deviation of the channel trajectory from an ideal channel trajectory with high precision in the order of below few nm.

In an embodiment of the disclosure, the 3D shape of such pillars within an integrated semiconductor sample is measured via a cross sectioning technique, utilizing a charged particle beam system to slice and image an integrated semiconductor to determine a 3D volume image of a predetermined volume within the integrated semiconductor. Such a cross section imaging technique can include the generation and storing of a set of cross section images. The charged particle system can comprise an electron microscope (SEM) for imaging and a focused ion beam system (FIB) for slicing, or an ion beam system for slicing and imaging.

3D memory chips (VNAND or 3D RAM) comprise many pillar-like structures running parallel to each other and sometimes referred to as memory channels or "pillars". According to an embodiment or the disclosure, a sample containing such a 3D memory device can be studied by the cross-section imaging technique utilizing a FIB-SEM-microscope. The FIB (Focused Ion Beam) is used to remove a thin layer of material from the probe slice by slice. In an example, the FIB is arranged such that the slices are oriented perpendicular to the pillar/channel axes, each new exposed surface will contain footprints of the pillars which usually have a circular shape and form a hexagonal grid. Each new exposed surface or slice is imaged by SEM (scanning electron microscope) or another charged particle imaging microscope one by one as the removal of the material from the probe with FIB is progressing. The 3D shape of the pillars is reconstructed using the stack of 2D slice images. The typical number of footprints of pillars in one slice can reach a few hundred. The typical stack of image slices can contain a few hundred images. In most applications, a large degree of automatization while reconstructing the pillars in 3D is used. In an embodiment, an automated workflow for such a reconstruction is described.

In an embodiment of the disclosure, a cross section image of at least one HAR structure is determined and extracted by image processing and/or pattern recognition within an intersection plane of the 3D volume image of the integrated circuit. The exact position of the cross-section image of the at least one HAR structure can thereby be determined within the predetermined volume with high accuracy. By repeating the determination and extraction of subsequent cross section images of the at least one HAR structure in subsequent intersection planes of the 3D volume image of the integrated circuit, the isolated 3D volume image of the HAR structure within the predetermined volume within the integrated semiconductor can be generated.

In an embodiment of the disclosure, the cross-section image of the at least one HAR structure is automatically evaluated by image processing to extract shape properties such as a lateral dimension of the cross section. In an example, an ellipse is approximated to the cross section of the at least one HAR structure. In another example, the shape properties comprise the area of the cross-section images. In an example, the shape properties of an HAR structure are utilized for defect detection or defect review.

In an embodiment, the evaluation further includes the extraction of the center of the cross-section image of the at least one HAR structure within the 3D volume image with high accuracy. The extraction of the center can be accomplished by computation of the center of gravity of the cross-section image of the at least one HAR structure.

By repeating the evaluation of subsequent cross section images of the at least one HAR structure in subsequent intersection planes of the 3D volume image of the integrated circuit, the 3D channel trajectory or 3D trajectory can be generated. In one example, the 3D placement deviation trajectory is derived from the deviation of the 3D trajectory from an ideal or design trajectory. Since the coordinate system can be arranged such that the design trajectory extends in z-direction, perpendicular to the top surface of the integrated semiconductor, the 3D placement deviation trajectory can be evaluated either along the 3D trajectory of the channel or in z-direction. From the 3D placement deviation trajectory, a maximum placement deviation can be derived. In one example, the maximum slop angle of the 3D trajectory relative the z-direction can be derived. In one example, a wiggling or twisted shape of the 3D trajectory relative the z-direction can be derived.

In an embodiment, the shape properties along the 3D trajectory of the HAR structure within the predetermined volume within the integrated semiconductor are generated repeatedly in a similar manner. Since the coordinate system can be arranged such that the design trajectory extends in z-direction, perpendicular to the top surface of the integrated semiconductor, the shape properties can be evaluated either along the 3D trajectory of the channel or in z-direction.

In an embodiment, the conductivity of the channel is determined by the minimum cross section area of in the channel. In an embodiment, peaks, defects or disruptions or inclusions within the channel boundary surface are extracted.

In an embodiment, the 3D trajectories and shape properties of an HAR structure are determined and evaluated at least for two HAR structures. In addition to the 3D trajectories and shape properties of individual HAR structures, also relative properties of the at least two HAR structures can be evaluated. The relative properties include the channel proximity, such as distance of the 3D trajectories as well as the minimum distance of the outer boundary of the at least two HAR channels.

In an embodiment, a method of the disclosure comprises analyzing a set of HAR structures within an integrated semiconductor device, comprising obtaining a 3D tomographic image of a semiconductor sample, selecting a subset of 2D cross section image segments from the 3D tomographic image, each comprising cross section images of a set of HAR structures, identification of a contour of each HAR structures within the set of HAR structures in the subset of 2D cross section images, extraction of deviation parameters from the contours of the HAR structures of the set of HAR structures, analyzing the deviation parameters, wherein the derivation parameters comprise one or more of a displacement from an ideal position, a deviation in radius or diameter, a deviation from a cross section area, a deviation from a shape of a cross section.

In an embodiment, the method further comprises performing statistical analysis of at least one deviation parameter of at least one HAR structure of the set of HAR structures. In an example, the deviation parameter of the displacement from an ideal position comprises a tilt or a wiggling of an HAR structure.

In an embodiment, the method further comprises a step of obtaining 3D tomographic image comprises obtaining the 3D tomographic image by a charged particle microscope having at least one charged particle optical column.

In an embodiment, the method further utilizes comprises a charged particle microscope comprising a focused ion beam system (FIB) and a scanning electron microscope (SEM) arranged relative to each other at an angle between 45° and 90°. In an example, the relative angle is 90°, such that the FIB is oriented parallel to a surface of a semiconductor sample and the SEM is oriented perpendicular to the surface of the semiconductor sample.

In an embodiment, the method further comprises image processing, edge detection or pattern recognition in the step of identification of at least a contour of each HAR structures.

In an embodiment, the method further comprises a computation of minimum or maximum values of at least one deviation parameter of at least one HAR structure of the set of HAR structures.

In an embodiment, the method further comprises computing at least a distance between two adjacent HAR structures and a minimum distance between the two adjacent HAR structures.

In an embodiment, the method further comprises a detection and a localization of at least one local defect or inclusion in at least one HAR structure of the set of HAR structures.

In an embodiment, the method further comprises an image acquisition with a high-resolution scanning electron microscope and an identification and localization of the internal structure of at least one HAR structure comprising a core and at least one layer around the core.

In an embodiment, the method further comprises performing extraction of at least one deviation parameter from the contours of the internal structure of the at least one HAR structure and analyzing the deviation parameter.

In an embodiment, the method further comprises a step of fabrication process characterization, fabrication process optimization or/and fabrication process monitoring.

In a third aspect, the disclosure provides an apparatus that is semiconductor inspection device, comprising a focused ion beam device (FIB) adapted for milling of a series of cross sections of an integrated semiconductor sample, a scanning electron beam microscope (SEM) adapted for imaging of the series of cross sections of the integrated semiconductor sample, and a controller for operating a set of instructions, capable of performing steps according to at least one embodiment of the method discussed above, wherein the focused ion beam (FIB) and the electron beam microscope (SEM) form an angle of about 90° with one another.

In an embodiment, a method of wafer inspection comprises the steps of obtaining a 3D volume image of an inspection volume inside the wafer and selecting a set of templates representing cross sections of semiconductor features of interest in the inspection volume. The semiconductor features of interest can comprise one of the following: a metal line, a via, a contact, a fin, a HAR structure, a HAR channel or a gate structure. The method further comprises determining center positions of cross section of semiconductor features of interest within the inspection volume, for example by correlating the templates with a set of 2D cross section images of the 3D volume image. The method can further comprise the step of determining contours of semiconductor features of interest within the 3D volume image and the step of determining parameters of at least a representative primitive, the primitive matching the contours of semiconductor features of interest. The method can further comprise the step of analyzing the parameters. In an example, the method further comprises the step of assigning a subset of the plurality of cross section of semiconductor features of interest to a specific semiconductor feature of interest. The method can further comprise the step of generating the 3D volume image from a sample piece by a slice and image method utilizing a dual beam system. The dual beam system can comprise a FIB beam for slicing and a charged particle imaging microscope for imaging, for example a SEM or a HIM (Helium Ion Microscope). The method can further comprise the step of lift out of a sample piece from a wafer and holding the sample piece. The step of lift out can comprise a step of attaching the sample piece to a probe needle, moving the sample piece, and attaching the sample piece to a holder. In an example, the step of lift out of the sample piece from the wafer is performed in the dual beam device. The dual beam device can further comprise a LASER beam device configured for cutting the semiconductor sample from the wafer and the method can comprise performing a Laser cut into the wafer. The step of analyzing the parameters can comprise at least one of a computation of a statistical average and a statistical deviation, a comparison to a reference primitive, or a correlation with a wafer coordinate. As a result, a set of deviation parameters can be obtained. According to an embodiment, the method comprises classifying the deviation parameters as a certain type of defect. Examples for such classes of defects are "alignment error", "distorted shape", "too small distance", "too small diameter" etc.

According to a fourth aspect, the disclosure provides a computer program product with a program code adapted for executing any of the methods as described above. The code can be written in any possible programming language and can be executed on a computer control system. The computer control system as such can comprise one or more computers or processing systems. The computer program may be provided on a tangible storage medium.

According to a fifth aspect, the disclosure provides a semiconductor inspection device adapted to perform any of the methods according to any one of the embodiments as described above, as well as computer programs and storage media.

BRIEF DESCRIPTION OF THE DRAWINGS

The present disclosure will be even more fully understood with reference to the drawings, in which.

DETAILED DESCRIPTION

Figure 1A:
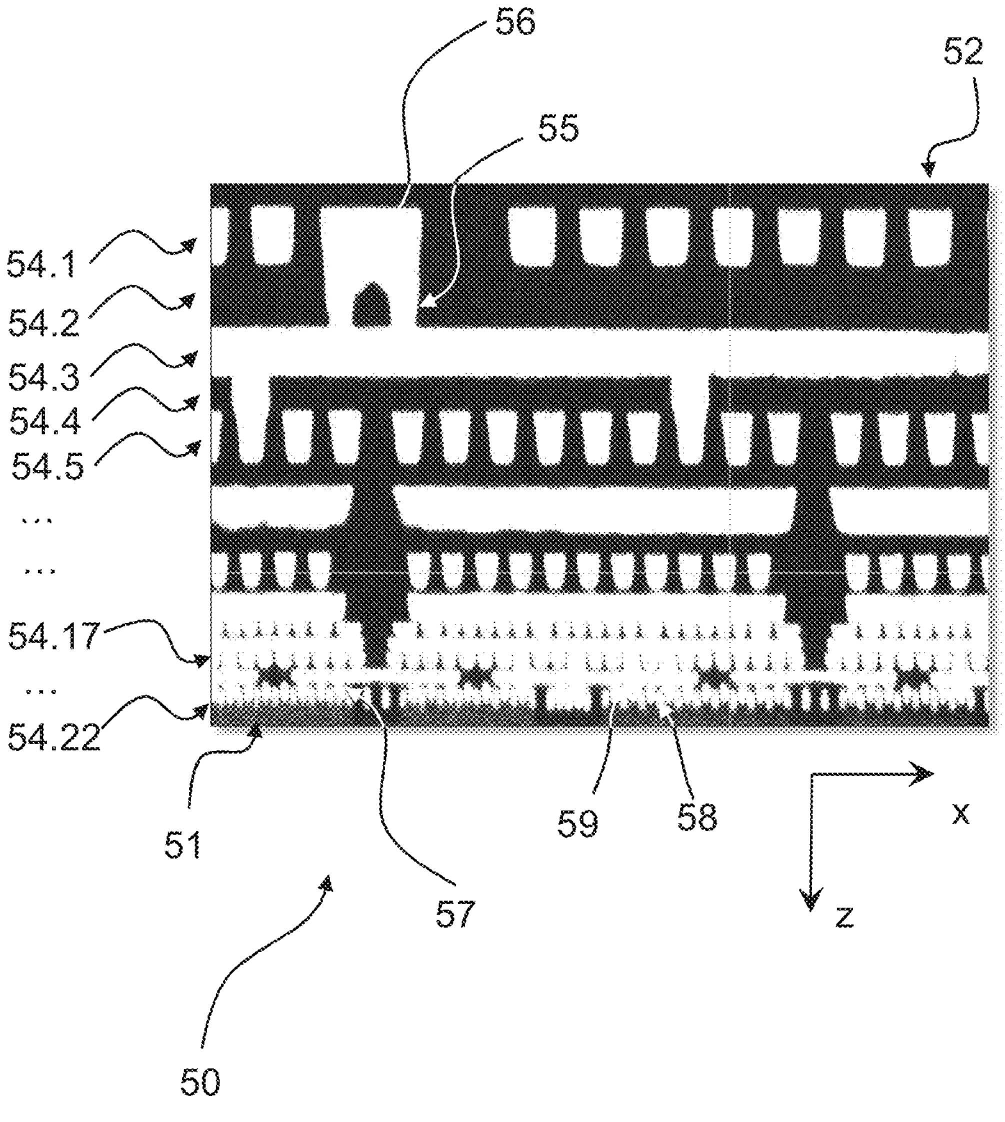
FIGS. 1A-1B show a semiconductor device.
Figure 1B:
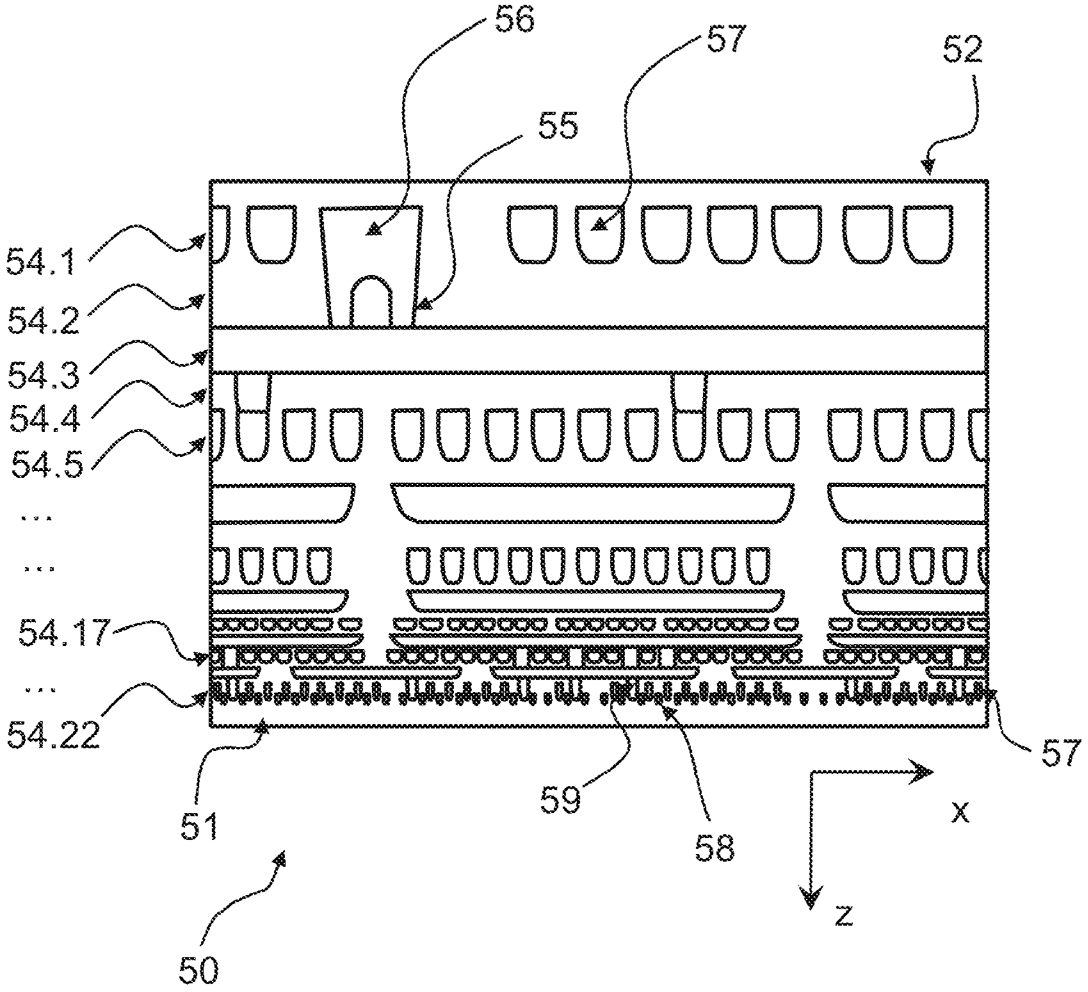
Figure 2:
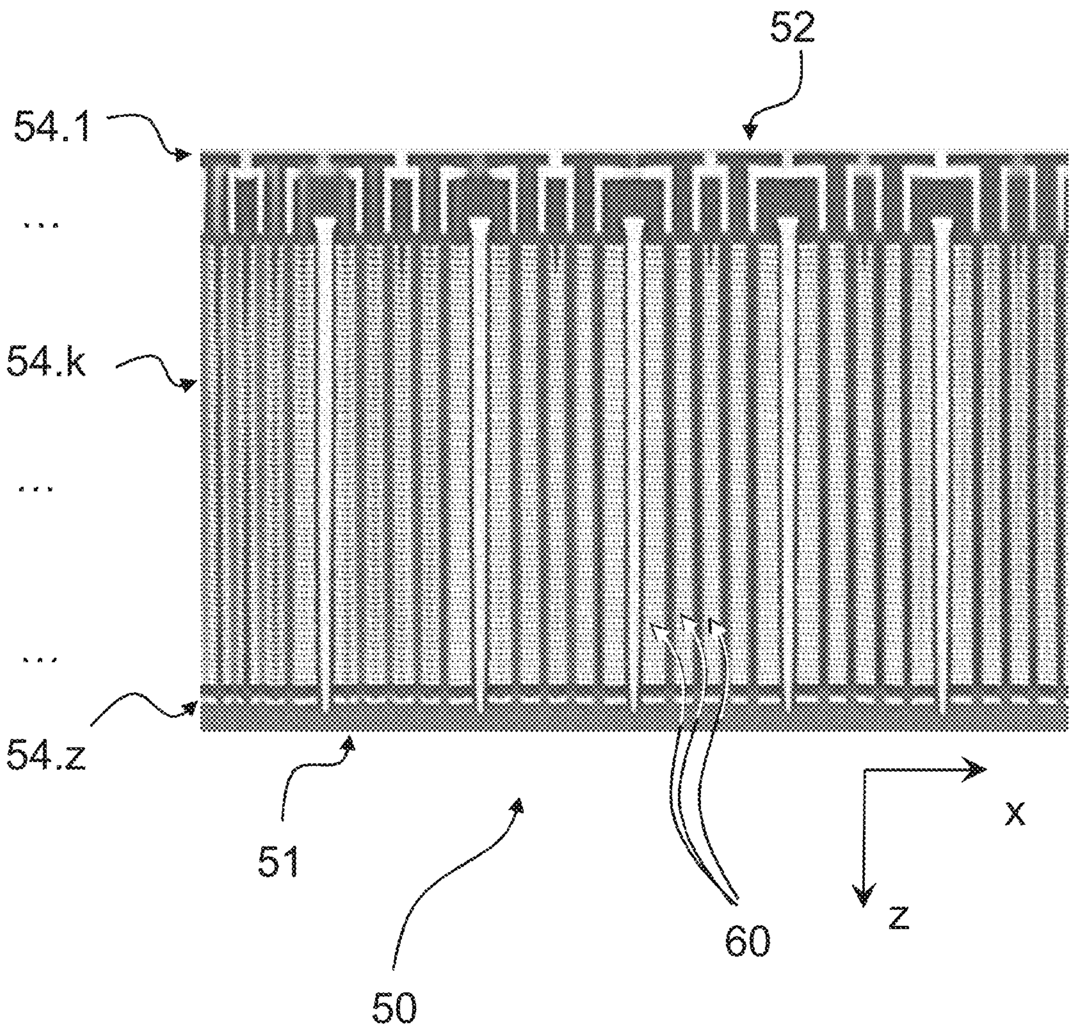
FIG. 2 shows a cross section of NAND device.

HAR structures, also commonly referred to as "pillars", "holes" or "channels", are fine, often pillar like and elongated structures extending through significant parts of the integrated semiconductor sample, oriented perpendicular to the metal layers. Throughout the disclosure, the terms "HAR structures", "channels" or "pillars" will be used as synonyms. Typical examples of HAR structures are shown in FIG. 2 in an image through a semiconductor memory device 50, such as a NAND memory device. HAR structures, such as the pillars or HAR structures, of which three are indicated by reference number 60, are part of memory cells, where charge is injected, held or measured, and erased in integrated electronic devices. Such HAR structures may be memory channels. The HAR structures are manufactured during fabrication of the integrated semiconductor in a sequence of adjacent layers 54.1, . . . , 54.*k*, . . . , 54.*z* and build from a sequence of segments stacked on top of each other. Examples of HAR structures are filled with insulating or conducting or semiconducting material, or a combination of both. Other examples of HAR structures are empty of any material (unfilled holes).

Figure 3A:
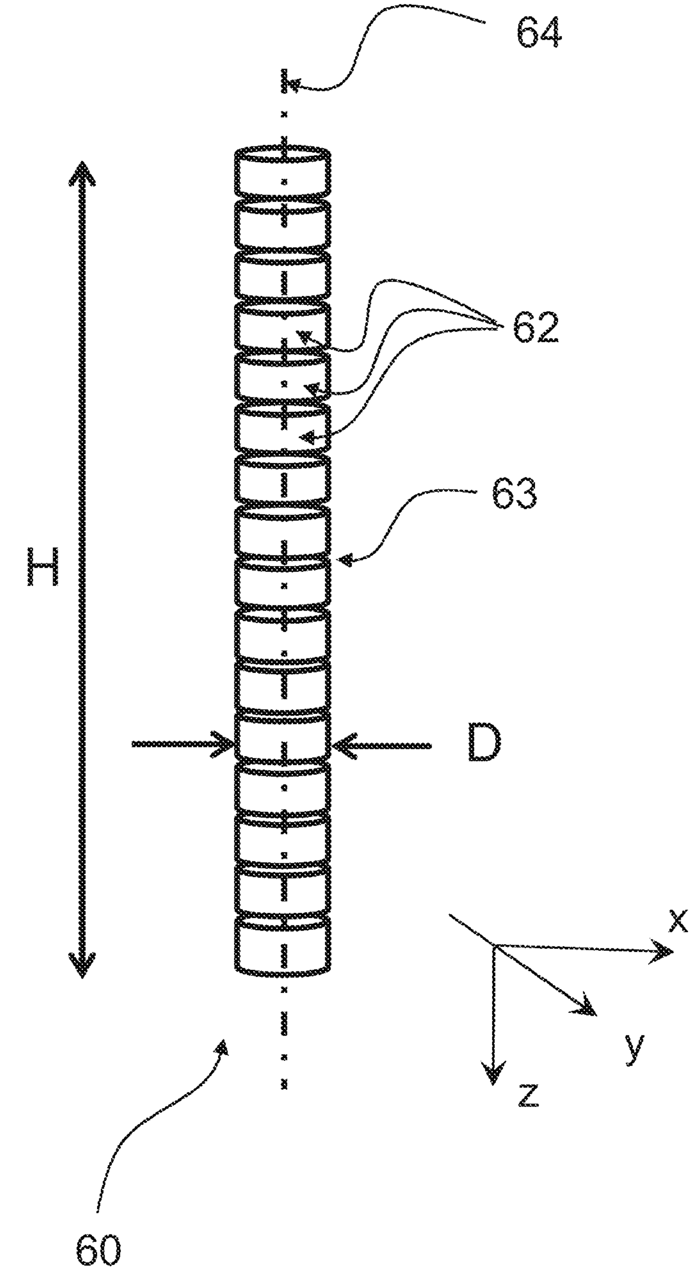
FIGS. 3A-3B show a pillar and pillar cross section.
Figure 3B:
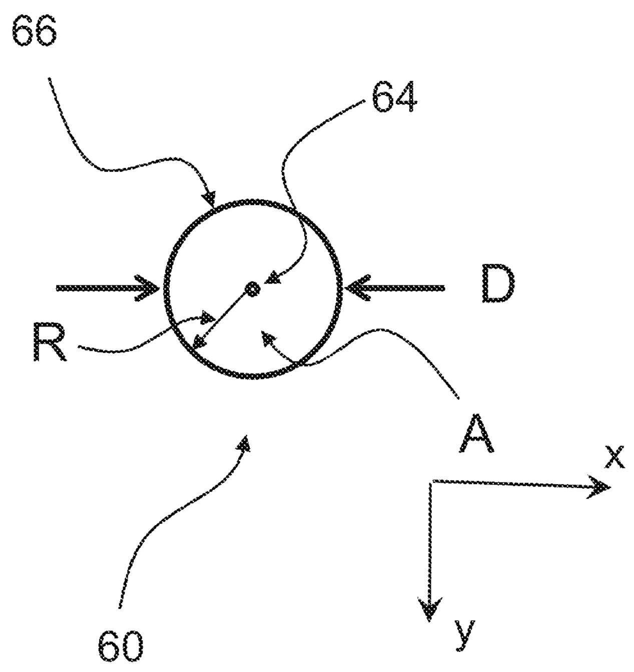

An example of an individual HAR structures 60 is illustrated in FIGS. 3A and 3B. In this example, a sequence of segments (three shown as pillar segments 62) are formed on top of each to form the long and thin pillar 60. The segments may be separated by thin gaps 63. In another example, not shown, a series of empty segments may be formed as a long, thin hollow pillar and filled afterwards. HAR structures having a high aspect ratio (HAR), with height H significantly greater than diameter D. Typical aspect ratios are H/D>5, with a height H, ranging from 10's of nm to about 10 um (micrometer) and a diameter, D, ranging from few nm to about 1 um (micrometer). In this example, illustrated in FIG. 3B in cross section perpendicular to the z-axis, the shape of an outer contour 66 of the HAR structure 60 is circular. The trajectory 64 of the pillar 60 is parallel to the z-direction and at the center of gravity of the circular shape of the outer contour 66 of the cross section illustrated in FIG. 3B. For an ideal pillar 60, at each z-position, the design area A of the cross section inside the contour 66 is constant. In addition to the diameter D, the radius R of an ideal circular cross section, half of the diameter D, is constant through the pillar.

Figure 4A:
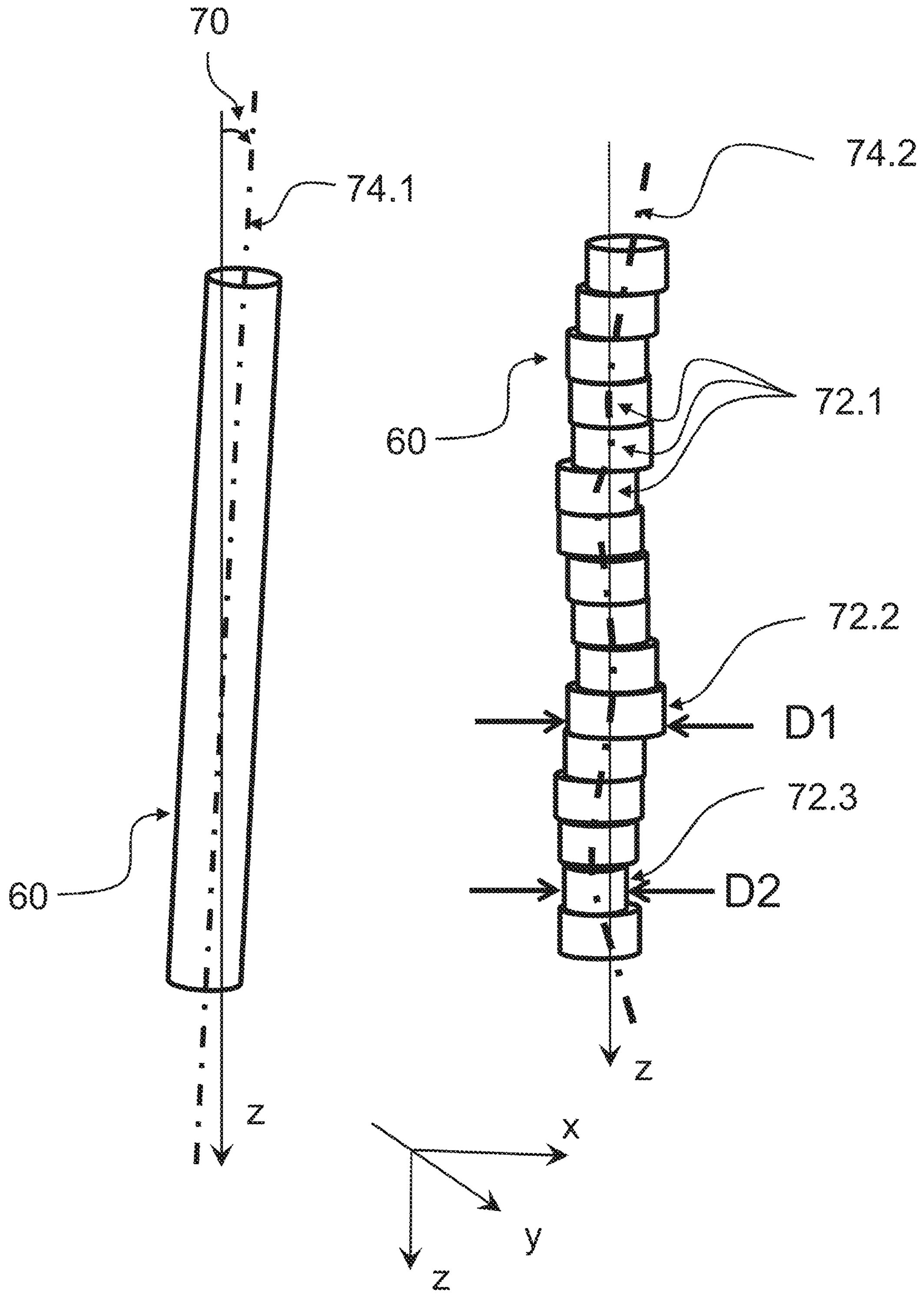
FIGS. 4A-4B show deviations of a pillar from ideal shape and form.

HAR Structures are for example formed by a large series or small metal structures in each subsequent layer, stacked on top of each other. The HAR Structures thus can suffer from several damages or deviations, thus as errors in the processing of individual planar layers as well as overlay errors between subsequent planar layers. Errors or defects within the HAR structures, however, limit the performance of a semiconductor device or may cause failure of such a device. FIG. 4 shows examples of such defects in a simplified model. FIG. 4A shows the effect of placement or overlay errors. For example, due to systematic alignment errors between individual layers of the integrated semiconductor, the trajectory 74.1 of a HAR structure 60 is inclined by an angle Θ (70) relative to the z-axis, as illustrated on the left half of FIG. 4A. In the example illustrated on the right side, the trajectory 74.2 of a non-linear or twisted shape is a consequence of statistical alignment errors. Due to statistical random alignment errors between individual layers of the integrated semiconductor, the pillar segments, from which three are illustrated by 72.1, may be laterally displaced. Consequently, the trajectory through the centers of gravity of each cross section of the pillar 60 deviates from a design trajectory and can reach a maximum deviation $T_{max}$ (not shown).

Figure 4B:
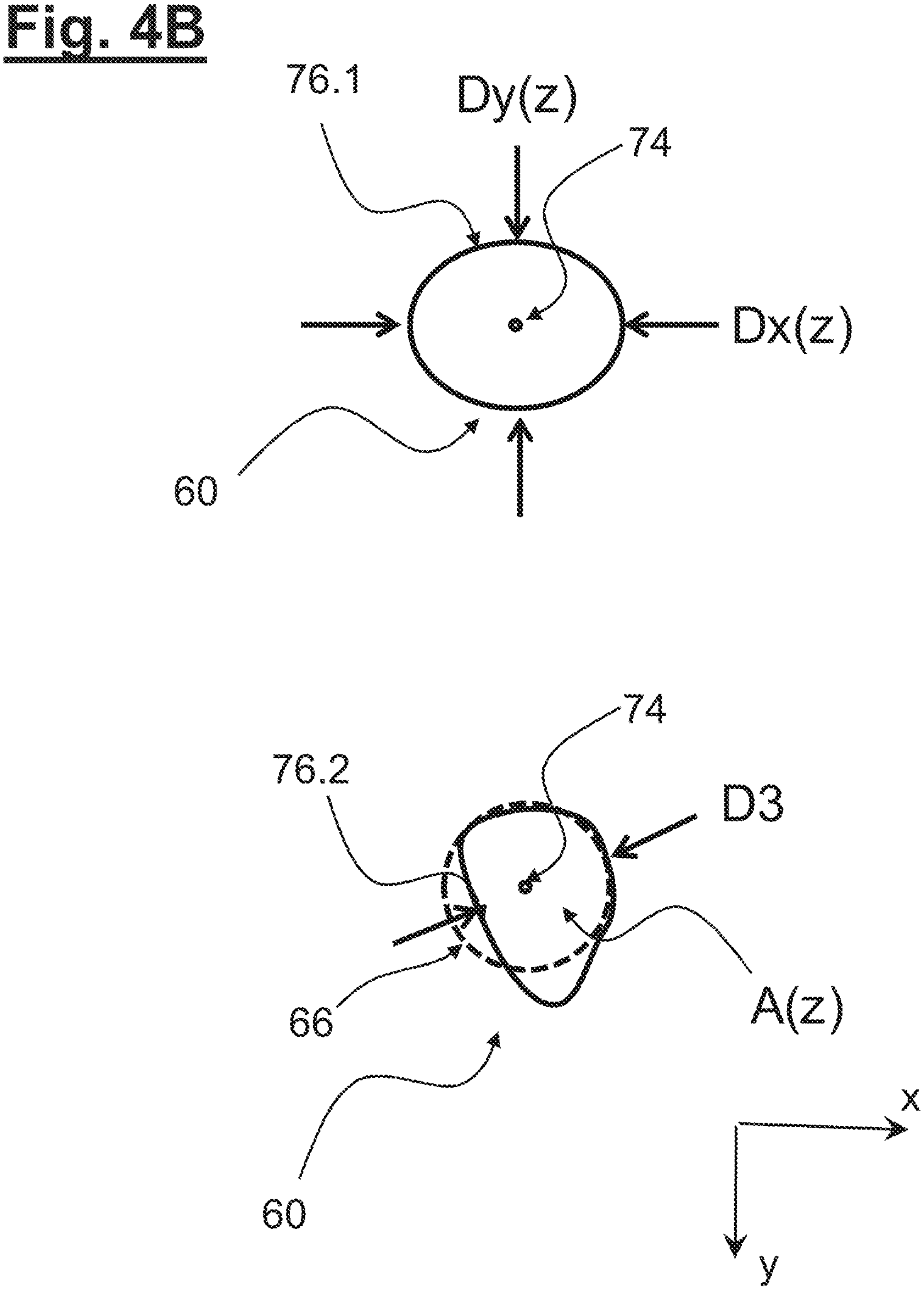

In addition, the pillar segments, such as the segment 72.2 with larger diameter D1 or the segment 72.3 with smaller diameter D2<D1, can deviate from the ideal design size and circular shape and thereby cause also a change in the lateral position of the trajectory 74.2. Such deviations in lateral size and shape are illustrated in FIG. 4B. The upper half illustrates a contour 76.1 of elliptical shape with diameters Dx(z) and Dy(z) of the HAR structure 60 at the z-position of the cross section, the lower half illustrates a general deviation of the circumferential shape 76.2 of a cross section from the ideal circular shape 66 of HAR structure 60. The contour 76.2 shows varying diameters in different directions with a minimum diameter D3. Such errors or deviations can arise from fabrication errors in the planar integration techniques, for example due to lithography mask or imaging errors. The HAR structures may also be only partially filled with material or a filling with wrong material may have occurred, or gaps within the HAR structure 60 may exist. This defects or inclusions can be throughout a pillar or locally confined to a smaller range in direction along the pillar (z-direction). As an effect, the cross-section area A(z) of the HAR structure may deviate from the design area A and change over z, and may have a minimum area A min at a specific z-position.

Figure 5:
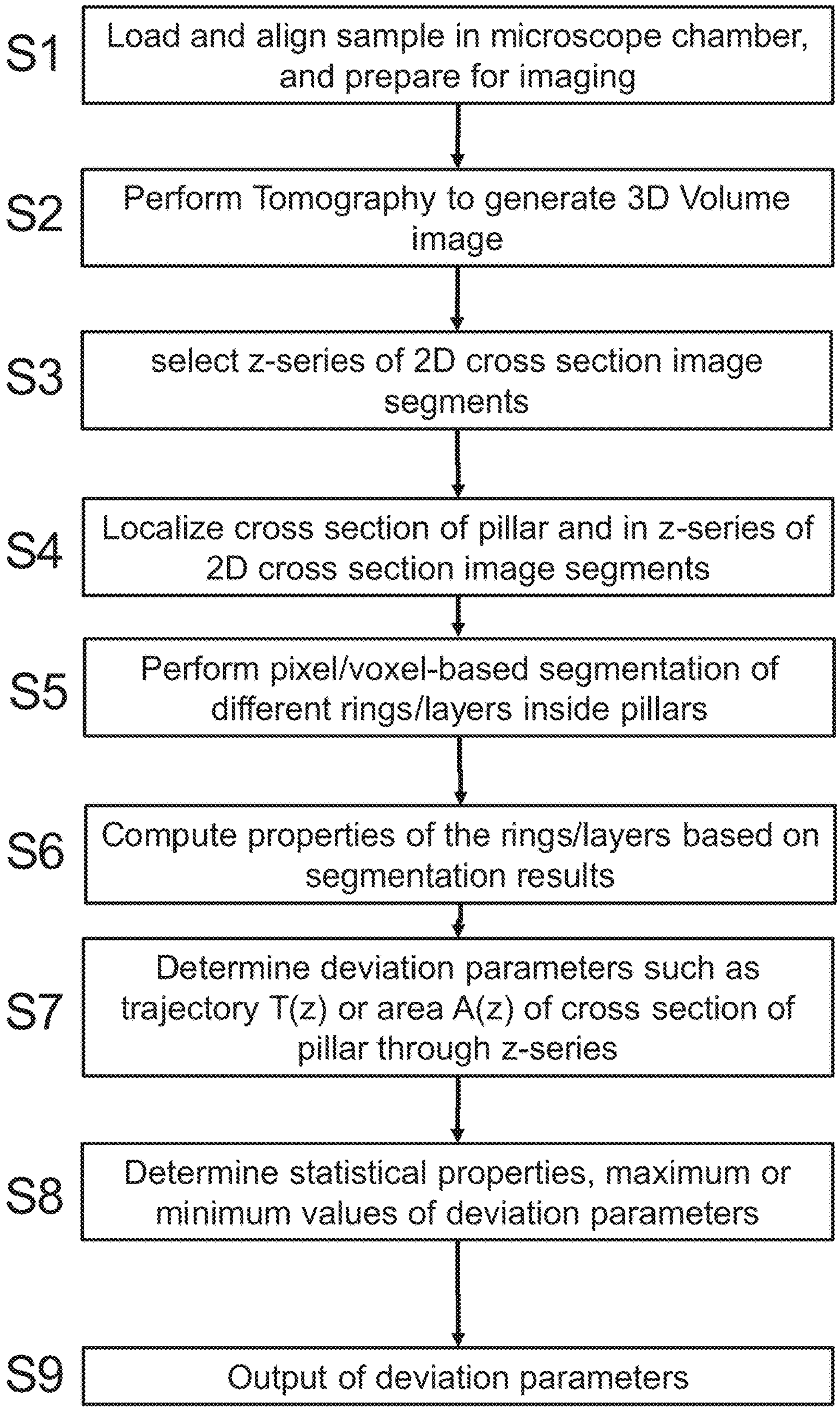
FIG. 5 shows method steps according an embodiment of the disclosure.

The amount of the deviations from ideal or design parameters is of importance for fabrication process development and characterization of fabrication processes for an integrated semiconductor device. Deviations can be indicators for process yield and process stability and thus reliability, as well as reliability and performance of an integrated semiconductor device itself. In an embodiment of the disclosure, the amount of deviation from ideal or design parameters such as trajectories T(Z) or cross section area A(z) is measured. An implementation of a method analyzing HAR structures is illustrated at FIG. 5. The method comprises analyzing a set of HAR structures within an integrated semiconductor device, comprising obtaining a 3D tomographic image of a semiconductor sample, selecting a subset of 2D cross section image segments from the 3D tomographic image, each comprising cross section images of a set of HAR structures, identification of a contour of each HAR structure within the set of HAR structures in the subset of 2D cross section images, extraction of deviation parameters from the contours of the HAR structures of the set of HAR structures, and analyzing the deviation parameters. The derivation parameters comprise one or more of a displacement from an ideal position, a deviation in radius or diameter, a deviation from a cross section area, a deviation from a shape of a cross section. Besides analyzing properties of pillars as a whole, the method of FIG. 5 includes steps S5 and S6 that analyze an internal structure of pillars like memory channels according to embodiments of the disclosure. While these steps are incorporated in the method of FIG. 5 to provide a comprehensive analysis of pillars, they may also be used separately from the remaining analysis steps of FIG. 5.

In step S1, a sample of a semiconductor device is loaded into a microscope chamber. The microscope will be explained below in more detail. First, the integrated semiconductor sample is prepared for the subsequent tomographic imaging approach by methods known in the art. The sample may have been generated by breaking of a semiconductor wafer, or any other methods known in the art, like laser cutting. As an alternative, the sample can also be prepared from a semiconductor wafer inside the microscope chamber by laser cutting or charged particle beam milling techniques known in the art. Either a groove is milled in the top surface of an integrated semiconductor to make accessible a cross section approximately perpendicular to the top surface, or an integrated semiconductor sample of block shape is cut out and removed from the integrated semiconductor wafer. This process step is sometimes referred to as "lift-out". The sample lift out from a wafer for further investigation can have a shape of a cuboid or block with size of up to few millimeters, such as about a few 100 μm. The sample is then prepared for the subsequent tomographic imaging step S2. The preparation can include an alignment and registration of the sample, an initial milling and polishing of selected surfaces of the sample, deposition of protective layers, as well as the generation of fiducial markers on surfaces of the sample. Surfaces for fiducials can be at least a single side surfaces or two or more surfaces of the sample.

In step S2, a 3D volume image of the sample is generated by a tomographic imaging approach. A common way to generate 3D tomographic data from semiconductor samples on nm scale is the so-called slice and image approach elaborated for example by dual beam or cross beam device. In such a semiconductor inspection device, two particle optical systems are arranged at an angle. The first particle optical system can be a scanning electron microscope (SEM), adapted for imaging of the series of cross sections of the integrated semiconductor sample. The second particle optical system can be a focused ion beam optical system (FIB), using for example gallium (Ga) ions and adapted for milling of a series of cross sections of an integrated semiconductor sample. The semiconductor inspection device further comprises a controller for operating a set of instructions, capable of performing steps according to at least one embodiment of the method.

The 3D tomographic data generation method, obtaining at least first and second cross section images includes subsequently removing a cross section surface layer of the integrated semiconductor sample with a focused ion beam to make a new cross section accessible for imaging, and imaging the new cross section of the integrated semiconductor sample with a charged particle beam. The focused ion beam (FIB) of Ga ions is used to cut off layers at an edge of a semiconductor sample slice by slice and every cross section is imaged using for example a high-resolution scanning electron microscope (SEM) with a resolution of few nm. The two particle optical systems FIB and SEM might be oriented perpendicular at an angle of about 90° to each other or at an angle between 45° and 90°. From the sequence of 2D cross section images, a 3D image of the integrated semiconductor structure is reconstructed. The distance dz of the 2D cross section images can be controlled by the FIB milling or polishing process and can be between 1 nm and 10 nm, such as about 3-5 nm. Throughout the disclosure, "cross section image" and "image slice" will be used as synonyms.

Figure 6A:
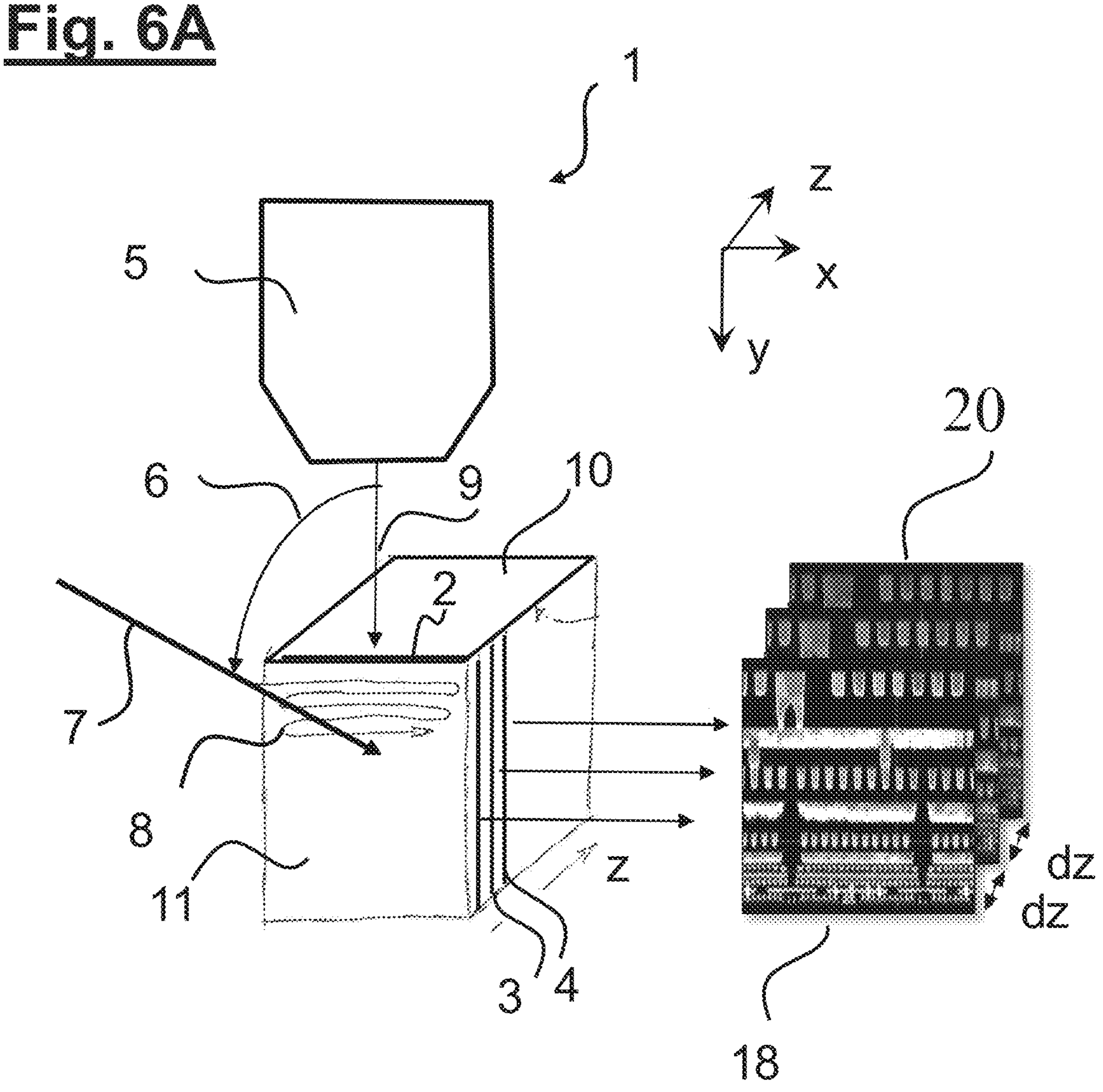
FIGS. 6A-6B show a cross beam microscope and slice-and image method.

FIG. 6A shows a schematic view of the slice and image approach to obtain a 3D volume image of an integrated semiconductor sample with a cross beam microscope 1. With the slice and image approach, three-dimensional (3D) volume image acquisition is achieved by a "step and repeat" fashion. For sake of simplicity, the description is shown at a block shaped integrated semiconductor sample 10, but the disclosure is not limited to block shaped samples 10. This slice of material may be removed in several ways known in the art, including the use of a focused ion beam milling or polishing at glancing angle, but occasionally closer to normal incidence by focused ion beam (FIB) 5. For example, the ion beam 9 is scanned along direction x to form a new cross section 2. As a result, a new cross section surface 11 is accessible for imaging with a CPB (not shown) with scanning electron beam 7. The cross-section surface layer 11 is raster scanned by a charged particle beam (CPB), for example the electron beam 7, but also a second FIB can be used for imaging. A simplified raster of scanning imaging lines 8 is illustrated. The optical axis of the imaging system can be arranged to be parallel to the z-direction, and thus be perpendicular to the axis of the FIB 5, or inclined at an angle 6 to the FIB-axis or y-direction. CPB systems have been used for imaging small regions of a samples at high resolution of below 2 nm. Secondary as well as backscattered electrons are collected by a detector (not shown) to reveal a material contrast inside of the integrated semiconductor sample, and visible in the cross-section image 18 as different grey levels. Metal structures generate brighter measurement results. The surface layer removal and the cross-section image process are repeated through cross section 3 and 4 and further surfaces at equal distance dz, and a sequence of 2D cross section images 20 through the sample in different depths is obtained to build up a three-dimensional 3D dataset. The distance dz between two subsequent image slices can be 1 nm-10 nm. For high precision reconstruction, image registration is carried out which generally refers to precision placement of cross section images in 3D volumes. Image registration can for example be carried out referring to positional markers or to so-called feature-based registration. Such a 3D volume image generation is described in German patent application DE 10 2019 006 645.6, filed on Sep. 20, 2019, which is hereby fully incorporated by reference. The representative cross section image 18 is obtained by measurements of a commercial Intel processor integrated semiconductor chip with 14 nm technology. The cross-beam microscope 1 also comprises several other devices and units, such as a stage with several degrees of freedom for positioning and moving of the sample, detectors, gas sources for deposition, an overview camera for navigation, manipulators to manipulate the sample, enclosures including a vacuum chamber, valves and ports, power supply and control devices to control the cross-beam microscope 1.

Figure 6B:
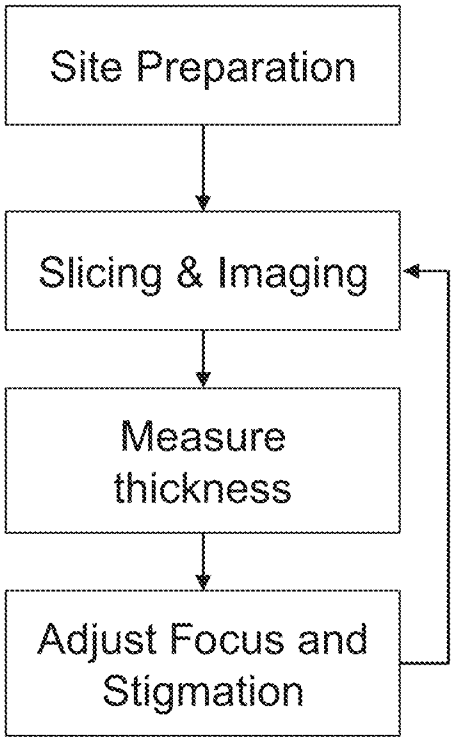

FIG. 6B further illustrates the cross-section imaging workflow. The process starts with a respective site preparation as already explained above. Then, a stack of 2D cross section images is created by serial FIB sectioning and imaging with a charged particle beam. During milling and imaging, the thickness of the slices is measured, and it is possible to adjust focus and stigmation of the charged particle lens as well as the FIB, leading to optimized slicing and imaging results. The step of stigmation is well known in the art and means the adjustment of focus and spot size, for example a fine tuning of the charged particle beam column to minimize aberrations like astigmatism. From the stack of 2D cross section images, a 3D data set can be determined. The cross-section images are registered and aligned with high precision to one another, for example by the method described in the above-mentioned German patent application DE 10 2019 006 645.6.

Figure 17:
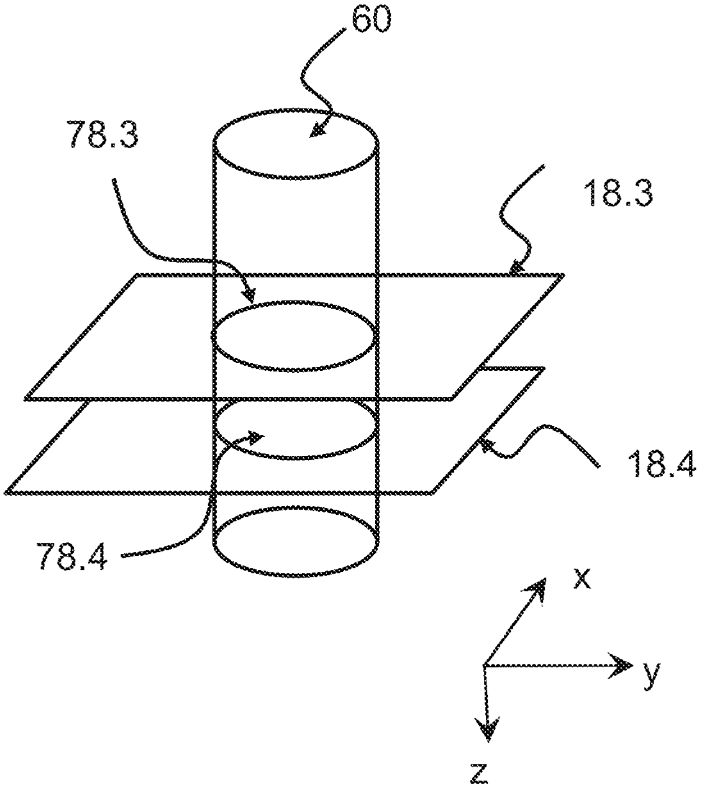
FIG. 17 shows a simplified illustration of 2D cross section image slices through a pillar.

FIG. 17 illustrates a simplified example of a cross section imaging method at a pillar or HAR structure. A sequence of 2D cross section images or image slices is generated, comprising the two 2D cross section images 18.3 and 18.4. Each comprises a cross section of the semiconductor feature of interest, in this example pillar 60, for example cross section 78.3 and 78.4.

The described 3D tomography has several advantages: It is possible to image 3D structures in their entirety. These structures can be, but are not limited to, HAR (high aspect ratio) memory channels, FinFETs, a metal line, a via, a contact, a fin or a gate structure etc. Furthermore, it is possible to review 3D volumes as cross sections from any direction to visualize a structure placement. In other words, arbitrary virtual cross section images can be generated. A 3D model can be determined from the 3D data set allowing visualization and measurement of 3D features in the 3D model from any direction. Additionally, it is possible to provide vast amounts of dimensional statistics in 2D and in 3D.

Figure 7A:
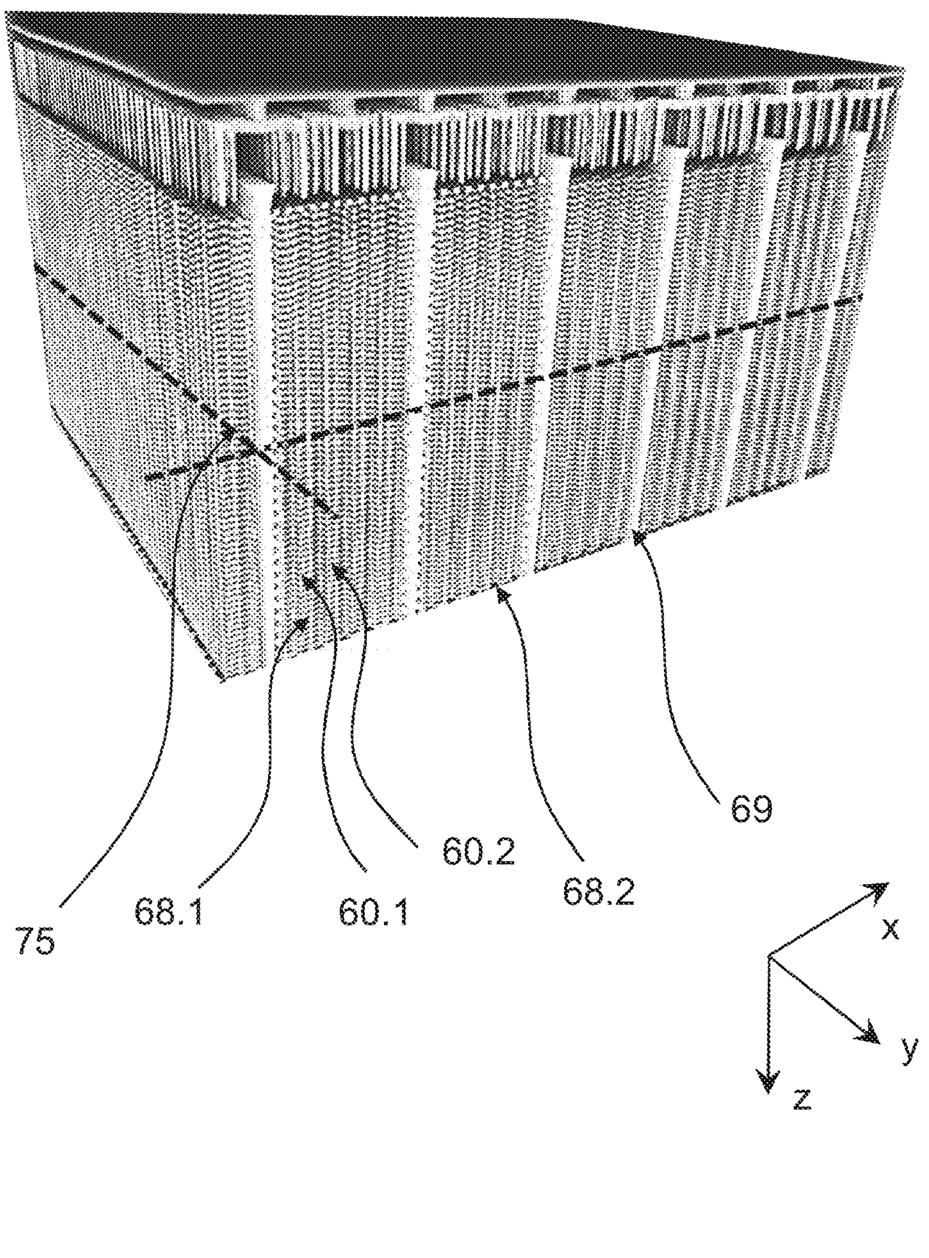
FIGS. 7A-7B show a 3D volume image of a NAND structure and an intersection image.

FIG. 7A shows the 3D volume image of a NAND memory device, comprising several pillars including pillars 60.1 and 60.2. The NAND structure within the 3D volume image of the sample volume comprises several sets or groups 68.1 or 68.2 of pillars or HAR structures, which are separated by structures 69.

Figure 7B:
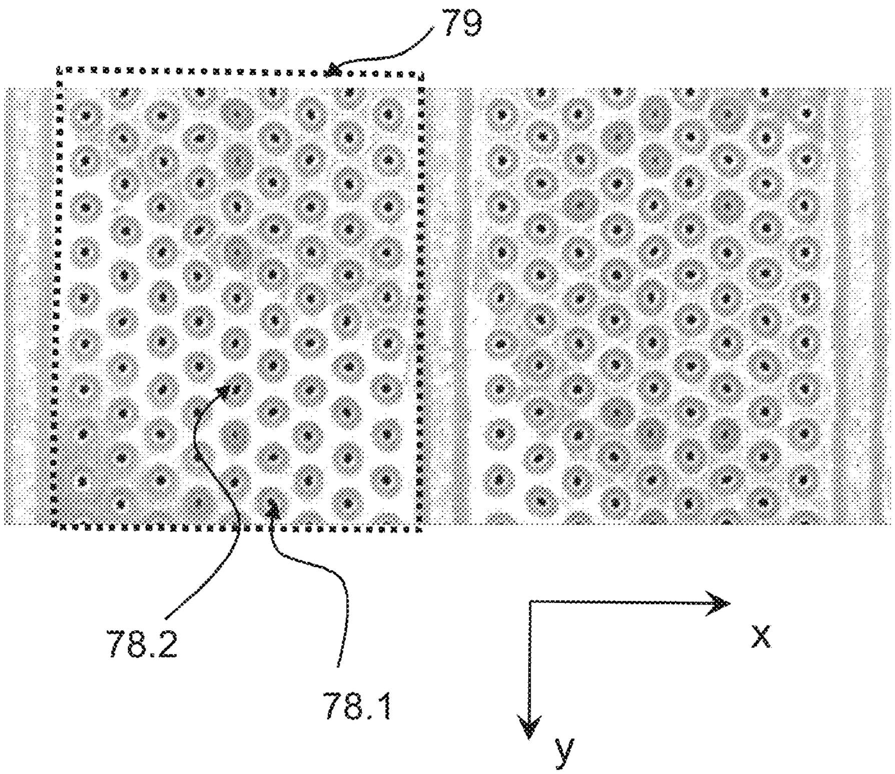

FIG. 7B shows a 2D cross section or intersection image of intersection plane 75 through the 3D volume image, parallel to the top surface of the NAND device, showing cross sections of several pillars including cross sections 78.1 and 78.2. The cross sections also show the cross section of groups of pillars or set of HAR structures, like the group 79 of pillars on the left side.

In step S3, a z-series of intersection images through the 3D volume image is selected. The selection can for example be done by user instructions utilizing a graphical user interface (GUI). For example, a user may select the six planes which form the boundaries of a cubic volume containing pillars. In another example of a routine inspection, the selection can be performed automatically based on programmed instructions in combination with a registration and image analysis of the 3D volume image. It may be desirable for a user input to confirm the automated selection, or the user may perform fine adjustments via a graphics user interface. As a result, a group of pillars like group 68.1 or 79 is selected. A z-series of intersection images is extracted from the 3D volume image, each comprising several cross-section images such as 78.1 or 78.2 of at least one pillar 60, 60.1, or 60.2. The z-series of intersection images extends parallel to the long direction of HAR structures, thus parallel to the z-direction. Each intersection image of the z-series represents a x-y cross section 78.1 or 78.2 of at least one pillar 60, 60.1, or 60.2 in at a different z-coordinate. The z-series comprises thus the intersection images of a set of HAR structures or pillars.

In one embodiment, the 3D-volume image is acquired in a so-called plane-view slice and imaging method, in which the semiconductor sample is milled and imaged layer by layer, beginning from the top layer of the semiconductor sample. Thus, a subset of 2D images obtained by the charged particle microscope corresponds to z-series comprising the cross sections of the pillars. In one embodiment, the image area plane-view slice and imaging method is selected to contain a predetermined set of pillars or HAR-structures, and the subsequently acquired 3D-volume image corresponds to the z-series of 2D cross-section image segments.

Figure 8:
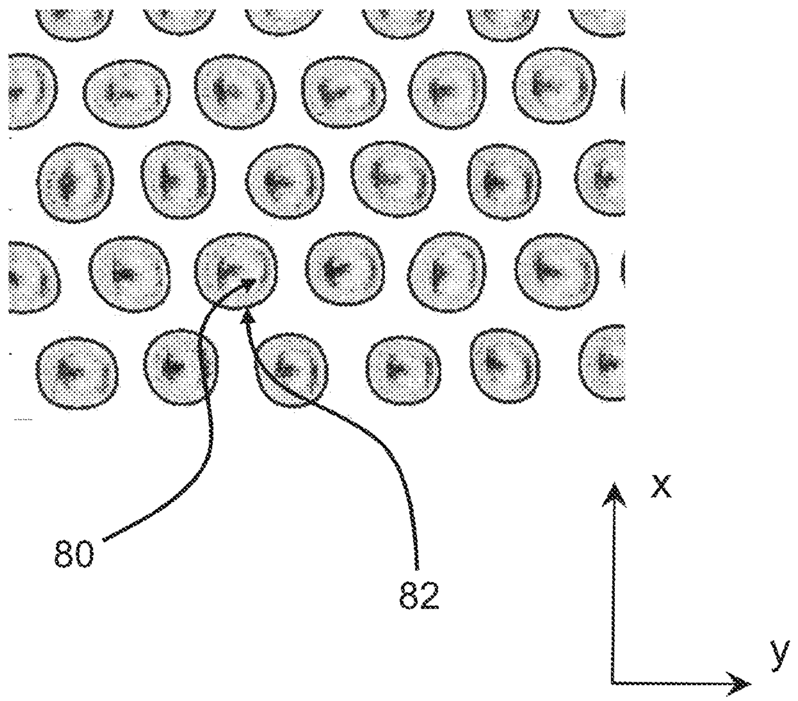
FIG. 8 shows a result of image processing and contour extraction.
Figure 9A:
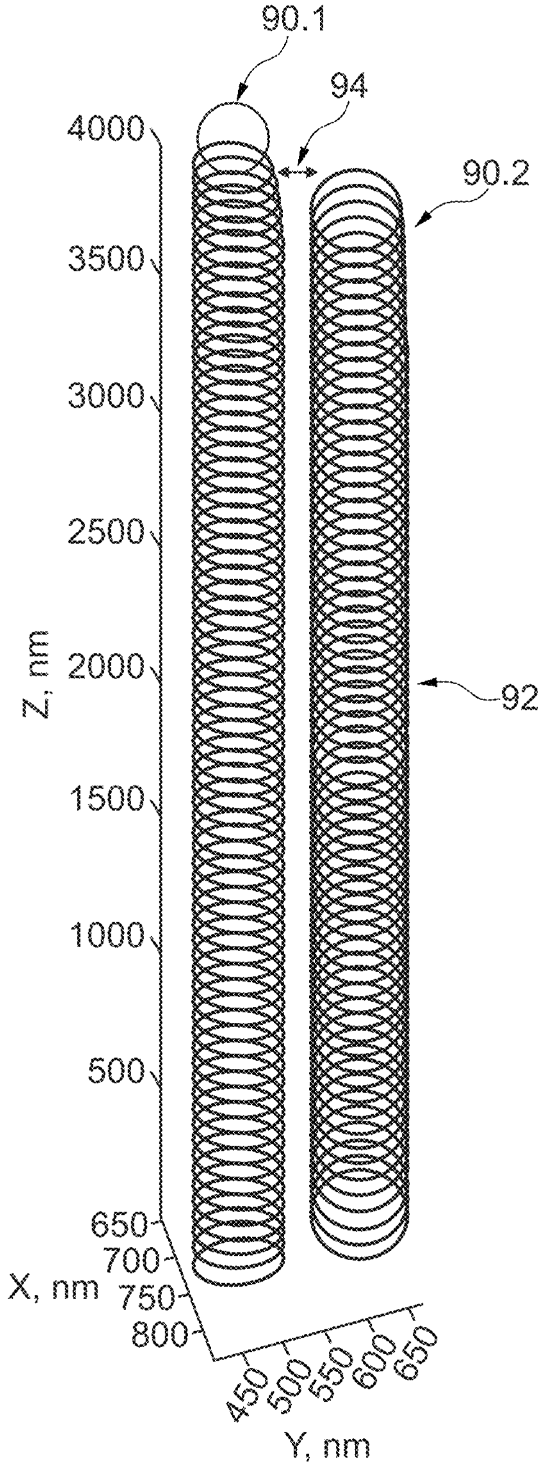
FIGS. 9A-9B show a set of contours for two pillars and distance between pillars.

In step S4, the cross sections of pillars of the set of HAR structures in the z-series of 2D intersection images are localized by image processing. Methods of image processing can include a contrast enhancement, a filtering, thresholding operations like clipping, edge detection by morphologic operations, or pattern recognition or combinations thereof or other methods, while all these methods are well known in the art. A result is shown in FIG. 8, showing a series of pillars after image processing. For example, pillar 80 is identified and the contour 82 of the pillar 80 is derived by edge detection. Other examples for contour extraction may be found in Image Contour Extraction Method based on Computer Technology from Li Huanliang, 4th National Conference on Electrical, Electronics and Computer Engineering (NCEECE 2015), 1185-1189 (2016). FIG. 9A shows the stack of contours 92 of the z-series of two pillars 90.1 and 90.2 of the selected group of pillars through z.

In step S7, the deviation parameters such as trajectory T(z) or area A(z) of the cross section of a pillar through the z-series is derived. It is understood that deviation parameters are either the differences of parameters versus a design or ideal parameter or a variation of a parameter for example through z or for several pillars, while the parameter should be constant through z or for several pillars.

Figure 10:
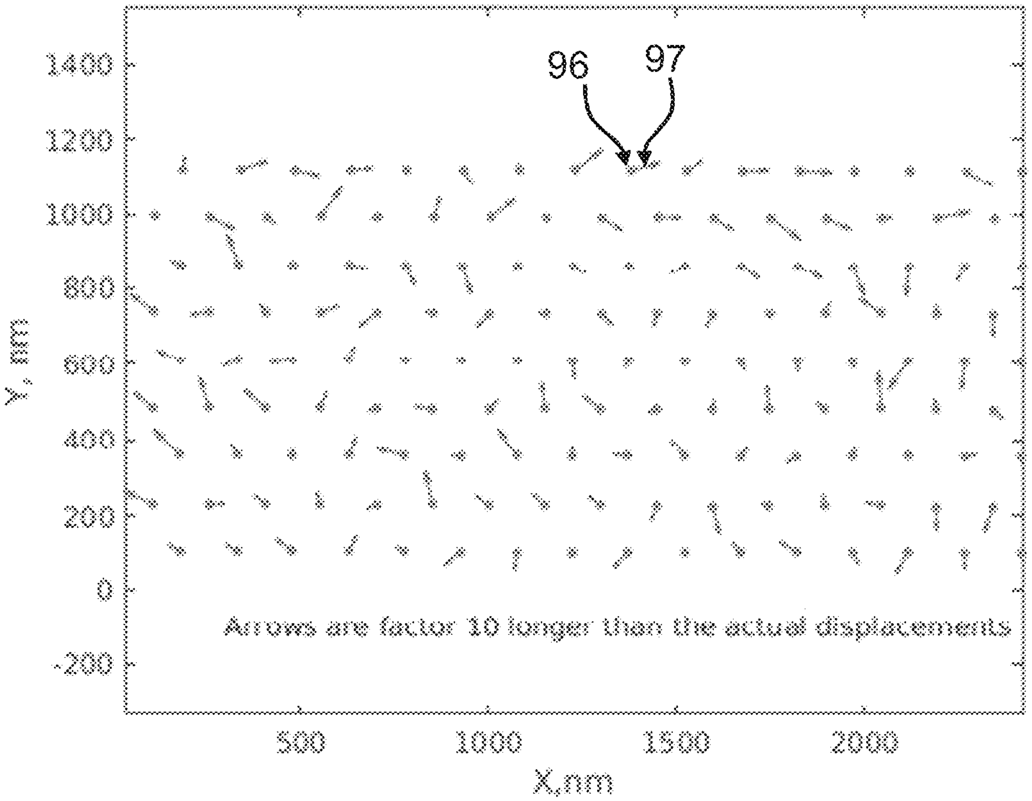
FIG. 10 shows displacement vectors for a set of pillars in one intersection plane.

First, the number and the centers of a series of pillars are computed in one z-position of the z-series. The centers may be computed by computation of the center of gravity of the cross-section image of a pillar, or by computation of the center of the contour by a geometrical or an analytical method known in the art. For example, a best fit circle or ellipse can be fit to the outer contour such as contour 82. The fitting of simplified geometrical forms such as circles or ellipses helps thereby to reduce the amount of data to describe the deviations of a pillar from ideal or design shape. For circles or ellipses, the centers are well known. From the center for each pillar and each z-position in the z-scan, the relative lateral displacement vectors of the centers of the pillar are derived. FIG. 10 shows the displacement vectors on enlarged scale for the pillars shown in FIG. 8.

Figure 11:
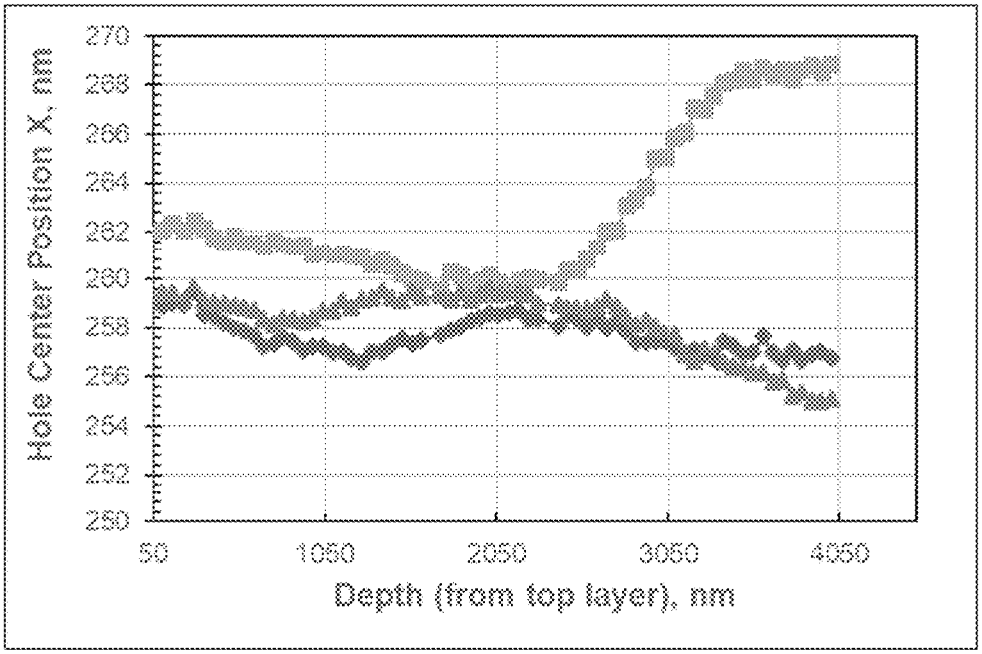
FIG. 11 shows a trajectory of three pillars (x-coordinate) through z.

The displacement can either be evaluated relative ideal pillar positions, shown as dots, with the ideal pillar position 96 of one pillar. The ideal pillar position can be derived from design or CAD data of the pillar positions, respectively, or by a best fit of a regular grid to the array of centers of pillars through all z-planes. A CAD data file may be in the GDSII (graphical design station/graphic data system II) format or OASIS (open artwork system interchange standard) format. A best fit can be achieved for example by minimization of the norm of the displacement vectors. The residual displacement vectors of one pillar, like the displacement vector 97, through the z-series together form the trajectory T(z) of the pillar though the 3D volume of the sample. FIG. 11 shows the x-component of the displacement vectors or trajectory T(z) of three pillars though the depth from top layer or in z-direction.

Figure 9B:
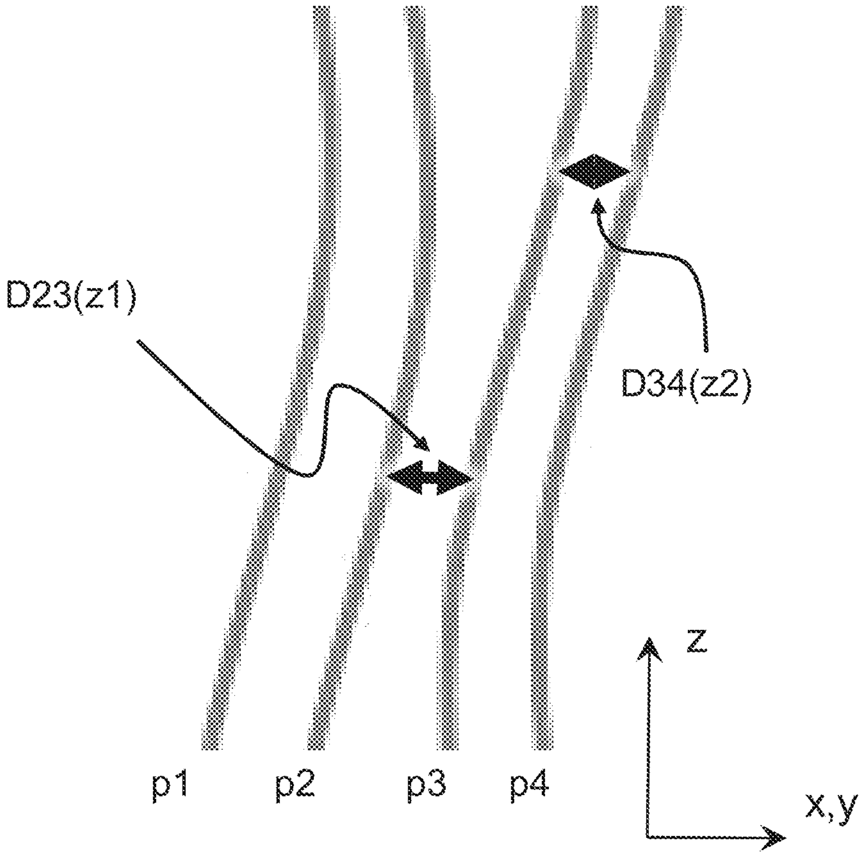

In an embodiment, the distance Dnm(z) between two pillars n and m is evaluated. As illustrated in FIGS. 9A and 9B, the minimum distance vector 94 between two contours 92 is computed as the minimum distance between two contours of two neighboring pillars 90.1, 90.2 by a geometrical or an analytical method. From the minimum distance vector, the distance Dnm(z) of the pillars through the z-series can be computed as a scalar function of z. FIG. 9*b* illustrates two minimum distance vectors D23(*z*1) or D34 (*z*2) between pillars p2 and p2 or p3 and p4, respectively, at two z-positions z1 and z2. Neighboring structures with too small proximity are susceptible for diminished functionality or reliability of NAND devices.

In an embodiment, step S5 comprises performing a pixel (picture element) or voxel (volume element) based segmentation of different rings and/or layers inside pillars using a trained machine-learning logic like a neural network. In an embodiment, step S6 then comprises computing parameters of rings and/or layers based on the segmentation results of step S5. Steps S5 and S6 will be described further below in more detail. Deviations from nominal or intended parameters may then be identified, e.g. if a ring thickness or ring radius is too large or too small.

Figure 12:
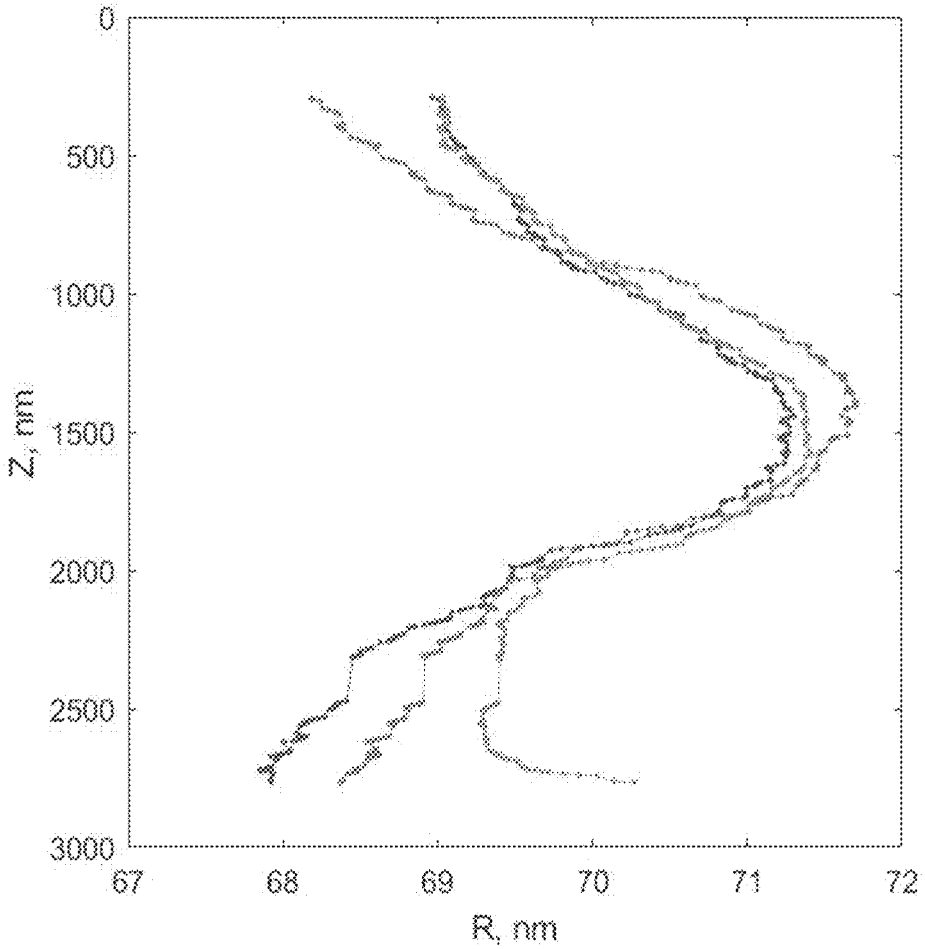
FIG. 12 shows a radius of contours of three pillars through z.

In an embodiment, step S7 comprises the computation of the radius R(z) of the best fit circle to the contour of a pillar through z. The computation of the best fit circle can be performed by minimum distance method or other methods known in the art. FIG. 12 shows the obtained radius R(z) for 3 pillars though z.

Figure 13:
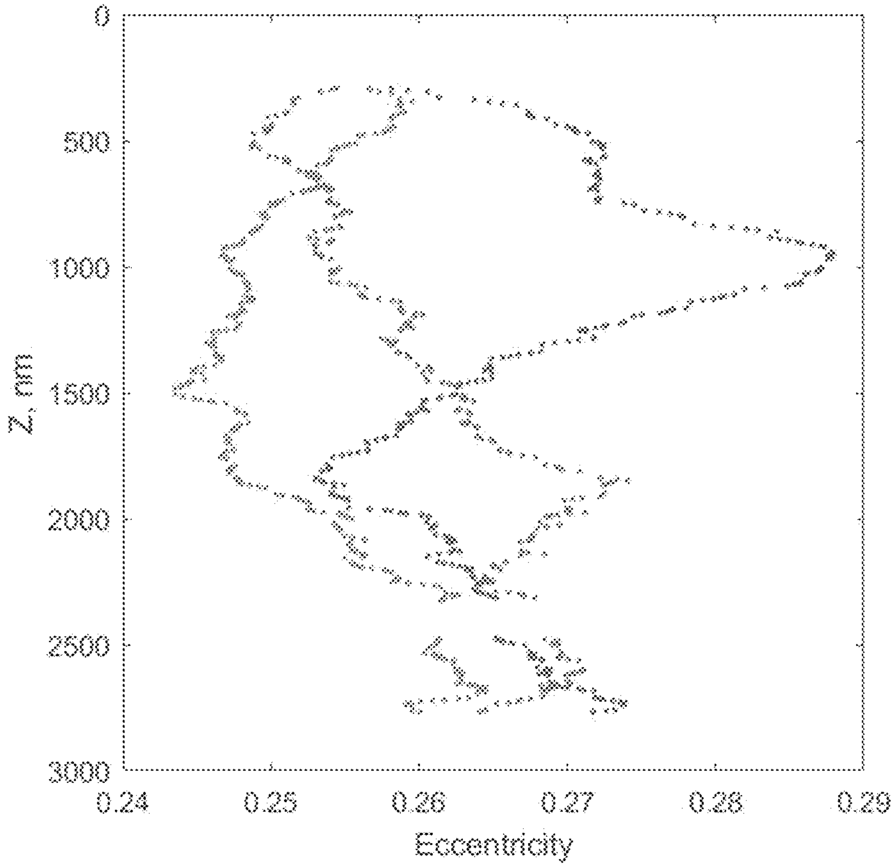
FIG. 13 shows eccentricity of contours of three pillars through z.

In an embodiment, step S7 comprises the computation of the eccentricity E(z) of the best fit ellipse to the contour of a pillar. The computation of the best fit ellipse can be performed by minimum distance method or other methods known in the art. FIG. 13 shows the obtained eccentricity E(z) for 3 pillars though z.

In an embodiment, the method step S7 further comprises the evaluation of the surface area A(z) enclosed by a contour out of the stack of 92. The evaluation can either be performed analytically from the best fit circles or best fit ellipses or performed by numerical integration of the area covered by a contour. In one embodiment, a volume V of a pillar can be computed from these stacks of contours 92, for example by integration of the areas A(z). In one embodiment, the minimum area A min is computed for each pillar or the deviation of the measured area A(z) from the design area is computed and illustrated as dA(z).

Figure 14:
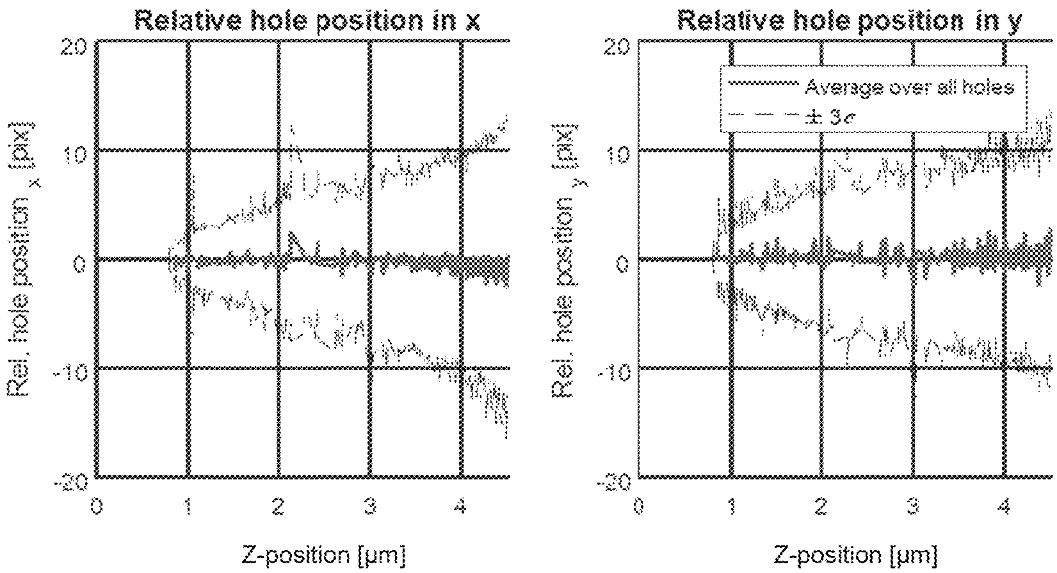
FIG. 14 shows a statistical analysis of displacement vectors of a set of pillars through z.

In an embodiment, a step S8 follows. In this step S8, the data obtained by step 5 is further analyzed for example for statistical properties, inclination angles or maximum or minimum values. Such analysis is useful for process optimization as well as error tracking in the fabrication of integrated semiconductor devices. For example, an inclination angle of a pillar is computed by evaluating T(z) of one pillar, e.g. by gradient computation or derivation of T(z). Statistical analysis can include the analysis of the trajectories T(z) for many pillars, showing a mean value of deviation $T_{mean}(z)$ as well as the standard deviation $T_{sigma}(z)$ for many pillars. FIG. 14 shows a result of mean value computation of a set of pillars through z, as well as the standard deviation increasing over z. In the same manner, deviations such as distance Dnm(z) of two neighboring pillars or areas A(z) or dA(z) of the pillars can be analyzed. This example demonstrates the stability of the planar integration techniques for semiconductor circuit fabrication, including the error propagation with increasing number of planar layers with increasing z-position.

In one embodiment, minimum or maximum values of deviations are computed. As one example, the minimum area $A_{min}$ for a pillar is evaluated as the minimum of A(z). The minimum area $A_{min}$ can be an indicator for resistance R of a pillar, with $R=\rho \cdot h/A_{min}$.

Here, R is the resistance, ρ is the resistivity, h is the length, and $A_{min}$ is the cross-sectional area. Another embodiment includes the computation of a global minimum area $A_{min,g}$ for all pillars. In another example, the maximum displacement $T_{max}$ for a pillar is evaluated as the maximum of the norm of T(z); another embodiment includes the computation of a global maximum deviation $T_{max,g}$ for all pillars.

In step S9, the analysis, and the result of the analysis such as the deviation parameters mentioned above, are listed or stored in a file, or a memory. The deviation parameters can be compared to thresholds or can be accumulated of a large set of inspection runs to generate a database of inspection results. If, for example the minimum distance $D_{min}$ is below a threshold, charge in the semiconductor device can leak and a block of pillars can be malfunctioning. A method according to the disclosure, however, allows to inspect semiconductor wafers with random samples during fabrication or during process development, and can indicate deviations from design or target values and thus allows a process control or process optimization. According to an embodiment, the method comprises classifying the deviation parameters as a certain type of defect. Examples for such classes of defects are “alignment error”, “distorted shape”, “too small distance”, “too small diameter” etc.

Figure 15A:
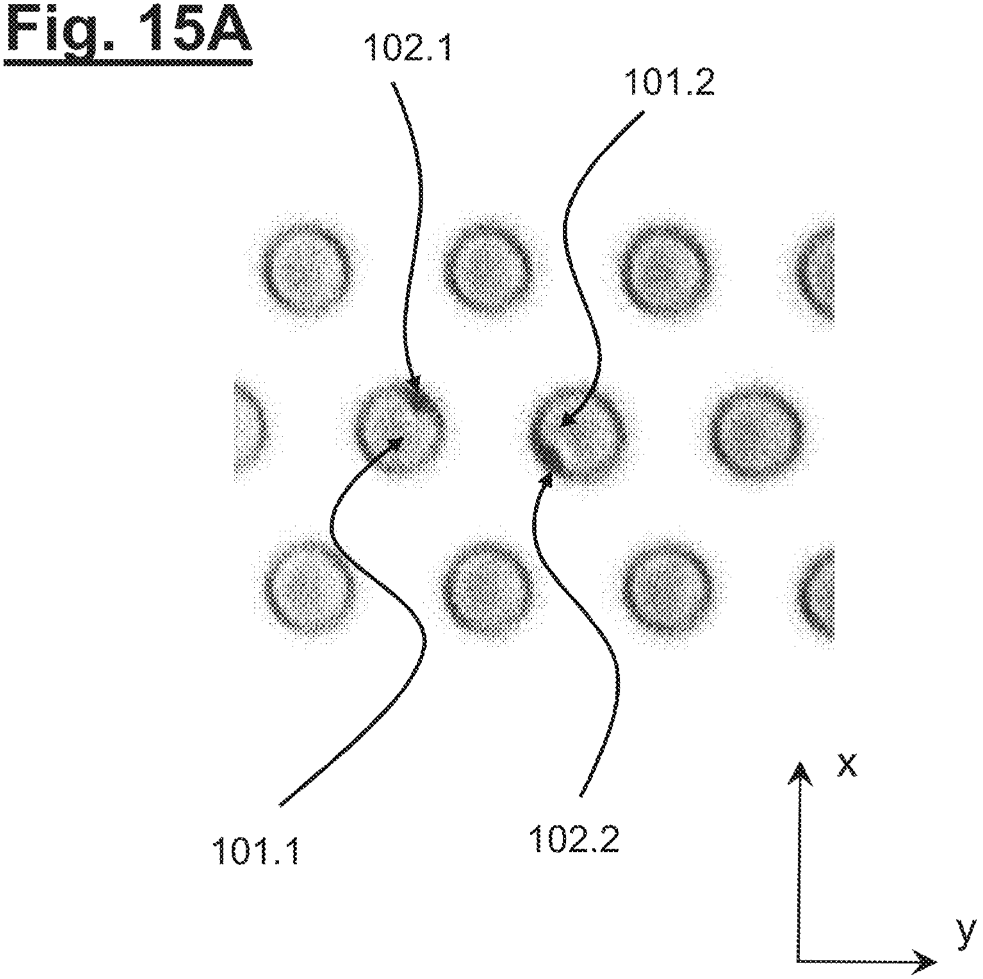
FIGS. 15A-15B show inclusions or local defects of pillars.
Figure 15B:
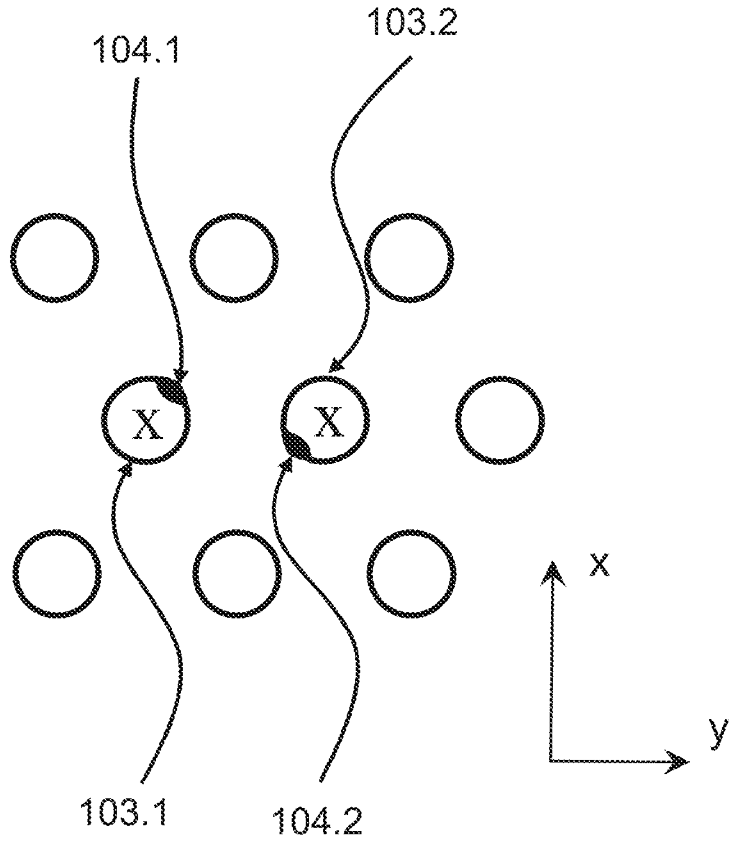

In one embodiment, the pillars are evaluated for local defects, such as a fill with a wrong material, a particle defect, contamination or any other defect, which leads to a local deviation of a circumferential cross section, in the following also called inclusion. An example is illustrated in FIG. 15A. Two pillars show such inclusions 102.1, 102.3 in their cross section 101.1, 101.2. The inclusions can extend over few intersection images of the z-series of intersection images. After contour extraction (shown in FIG. 15B), the contours 103.1 and 103.2 and the area of inclusions 104.1 and 104.2 are extracted. The defective pillars are further identified with marks “x”. The area of inclusions 104.1 and 104.2 increase the roughness of the outer surface contour of the pillars and can be a source of malfunction. The inclusions 104.1 and 104.2 are for example compared to reference inclusions to decide whether a device is malfunctional or properly working. In an embodiment, the number of inclusions or marks throughout a set of pillars is evaluated and thus a rate of process errors is derived and for example monitored over a set of fabricated semiconductor samples.

Figure 16A:
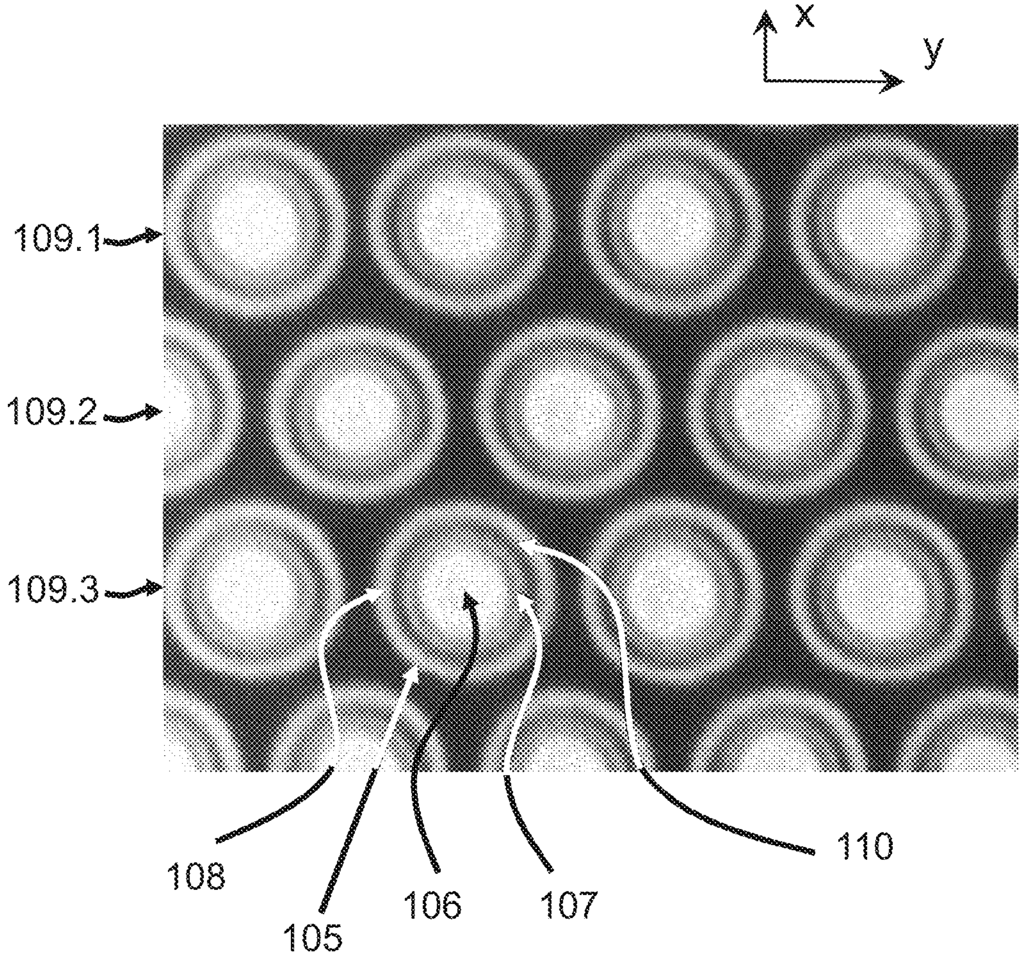
FIG. 16A shows a high resolution SEM image of a set of pillars.
Figure 16B:
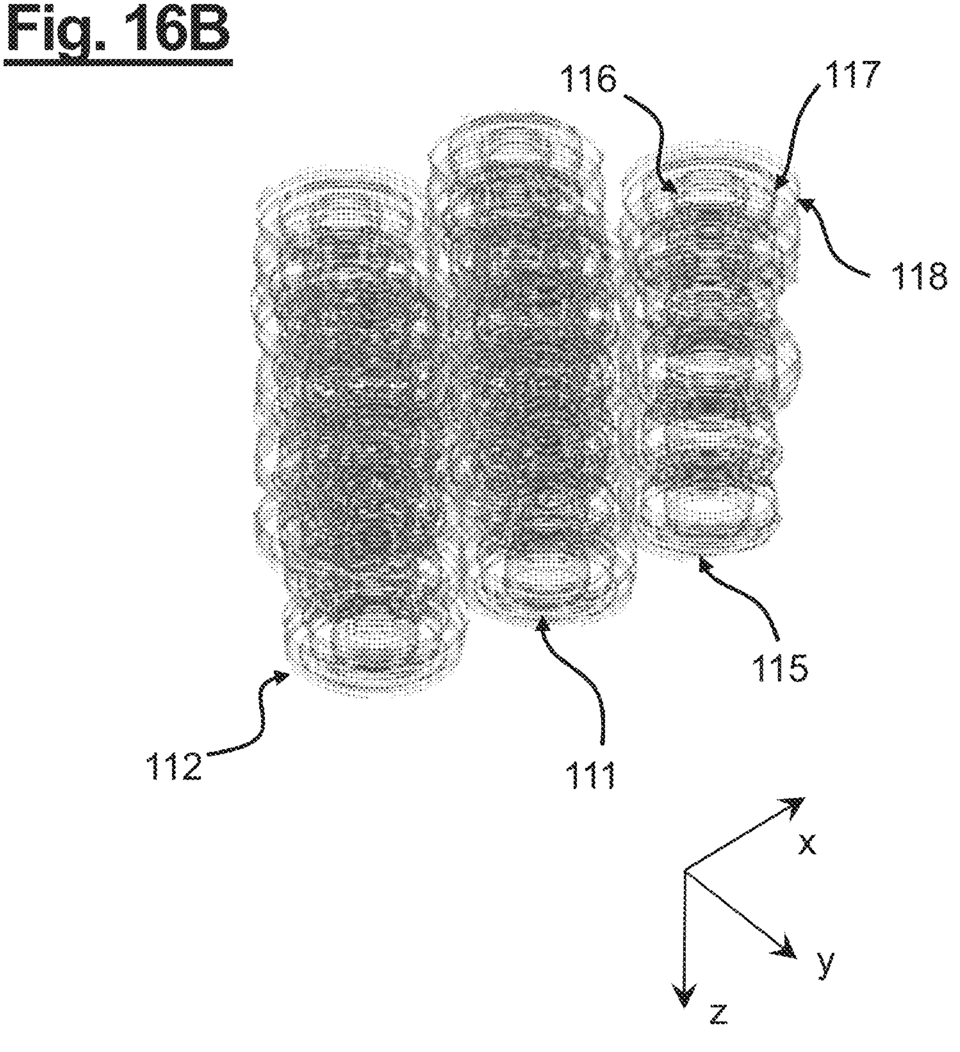
FIGS. 16B-16C show contours of core and layers of pillars.
Figure 19:
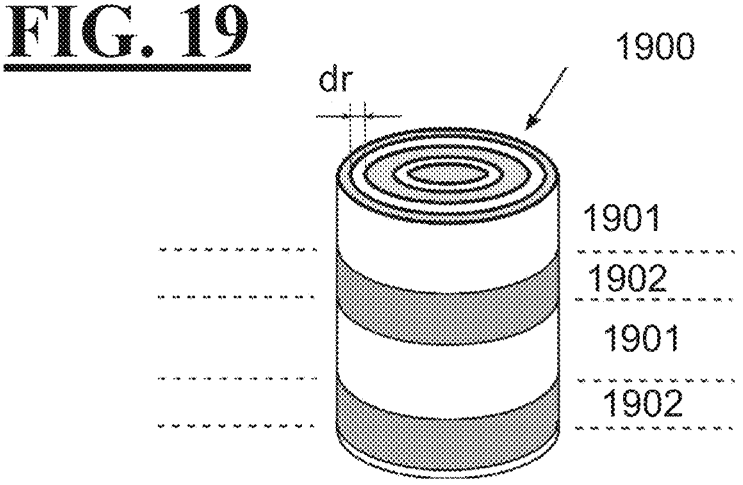
FIG. 19 schematic perspective view of a memory channel.

As mentioned above, in an embodiment, for example in steps S5 and S6 above, the internal pillar structure is further analyzed. The pillars comprise for example an internal channel and several layers around the internal channel, made from different conducting or semiconducting materials. For example, the several layers around a core channel can comprise a tunnel layer, isolation layers, a charge trap layer and a block layer. In each intersection image, these layers are identified by their material contrast and can be analyzed in the same way as described above, for example the outer contour or contour, the trajectory of ring-shaped area of the layers can be derived. FIG. 19 shows a schematic perspective view of a memory channel 1900 as an example for a pillar with such a ring structure, where a diameter of one of the rings is denoted dr. In its length direction, memory channel 1900 has word lines 1902 alternating with dielectric material 1901. FIG. 16A illustrated the example of a high-resolution intersection image of an array of such pillars, achieved by a SEM in high resolution mode. The figure shows a set of pillars in 3 rows 109.1, 109.2 and 109.3. At the example of one pillar 105 in row 109.3, the core 106, a first, middle layer 107 and a second, outer layer 108 are illustrated; the second, outer layer 108, and the first, middle layer 107 are separated by an isolation layer 110. FIG. 16B illustrates the extracted contours 116, 117 and 118 of the core 106 and layers 107 and 108, respectively, of the set of contours 115 of pillar 105, together with the contours of some other pillars, for example the set of contours 111, 112 of neighboring pillars. A typical volume of interest (for example a few μm wide and up to 15 μm deep) may contain for example more than $10^5$ cross-sections of pillars, so for analyzing the internal structure a fast and effective approach is used for example for determining the properties of the channels in manufacturing process development and monitoring.

Figure 16C:
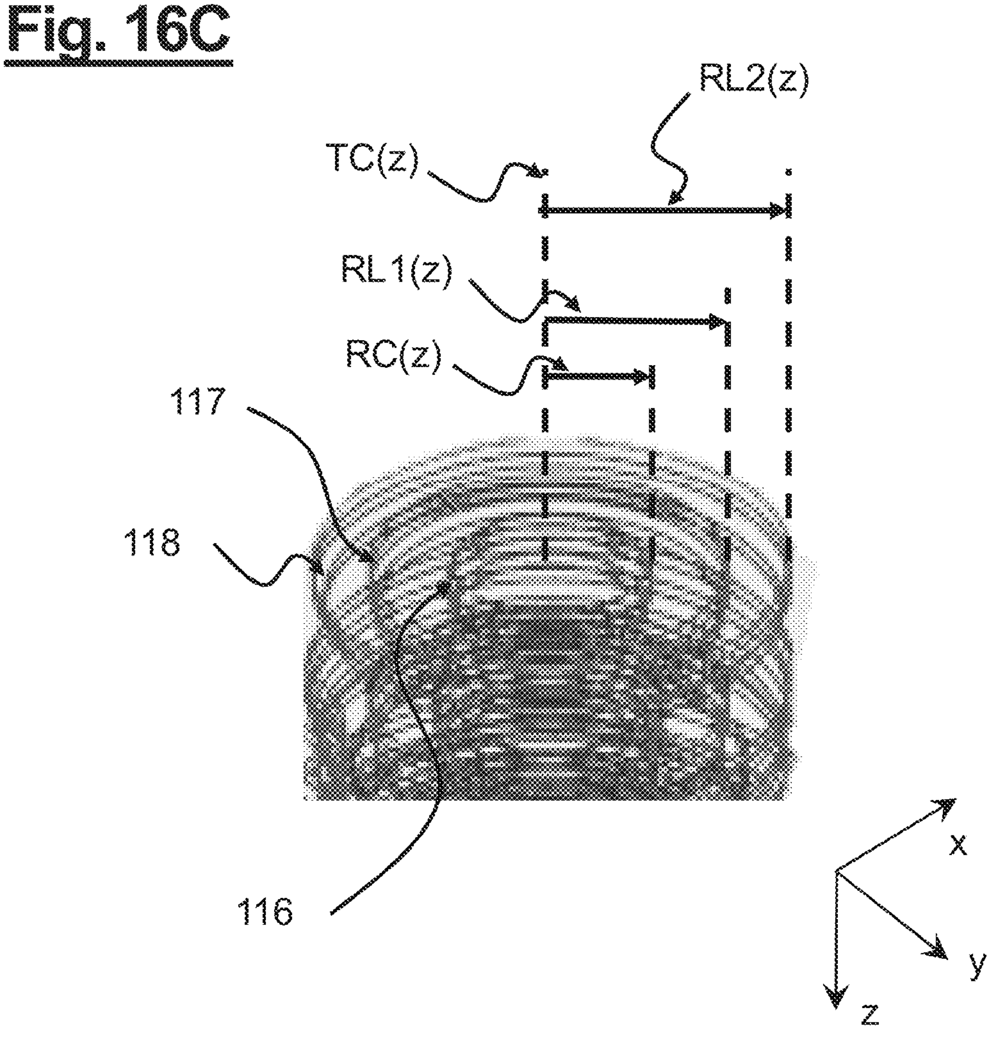

In some embodiments, For each set of contours, the trajectories TC(z), TL1(*z*), TL2(*z*), . . . of the core and the layers, as well as the respective areas AC(z), AL1(*z*), AL2(*z*), . . . of the core and the layers of a pillar can be computed in the same manner as described above for the outer contour. In the same manner as described above, the ring thickness of layers, the internal distances between layers can be computed, and a minimum thickness or distance can be derived. FIG. 16C illustrates at an example the radius RC(z), RL1(*z*) and RL2(*z*) relative the trajectory of the core TC(z) for the contours 116, 117 and 118. All the generated parameters of a set of pillars can also be analyzed by a statistical method, as described above. Also, local defects in layers, which can cause leaks, can be detected and counted. This allows for a detailed statistical analysis of a huge set of data characterizing the internal structure of pillars, such as local defects or inclusions of cores and layers, or distances between core and layers. Furthermore, ring radii and diameters like dr may be determined in some embodiments, thus allowing analysis and examination of the internal ring structure of the memory channel.

In an embodiment, a machine learning logic is used to analyze a cross-section image like the one shown in FIG. 16A. A machine learning logic, as used herein, refers to an entity that classifies and performs a segmentation on objects, in this case identifies the various parts of the ring structure like parts 106, 107, 108 and 110 of pillar 105 of FIG. 5, based on machine learning techniques, sometimes also referred to as artificial intelligence (AI). A machine learning logic is sometimes also referred to as a model. Segmentation generally refers to identifying separate parts of an object (in this case e.g. rings), so that the parts may be used for further analysis or other processing. Examples for a machine learning logic may for example include decision trees, vector machines or various type of neural networks like deep neural networks, adversarial networks or the like. A machine learning logic typically is trained by training data, e.g. images annotated by a user. Annotation refers to a user marking areas, in this case the rings, in some manner, for example using a graphical user interface (GUI). The thus annotated images are then used for training. Once trained, the machine learning logic then may be used in Step S5 of FIG. for performing the pixel or voxel based segmentation of the rings or other layers within pillars, for example.

Providing precise annotations to sufficient training samples for training of a machine learning logic is a challenge. Both a sufficient quantity of annotations, i.e. a large number of annotated cross-sections, and quality of the annotations, i.e. their correctness, are used to train a machine learning logic such that afterwards, the machine learning logic is capable of identifying the various ring segments automatically with high reliability. For example, insufficient annotations for training in case of a large three-dimensional data volume as in the present case may lead to so-called overfits and confusions between different rings, which are thus not identified correctly.

In the instant case, as can be seen in FIG. 16A, the ring structure, for example in the SEM image shown, consists of rings having alternating brightness. A brighter center circle is surrounded by a darker ring, which is in turn surrounded by a brighter ring and so on. This, in a single annotation process, may cause confusions between labels of rings of similar brightness.

Therefore, in embodiments, a two-step annotation process is used, which will be explained below referring to FIGS. 20 and 21.

Figure 21:
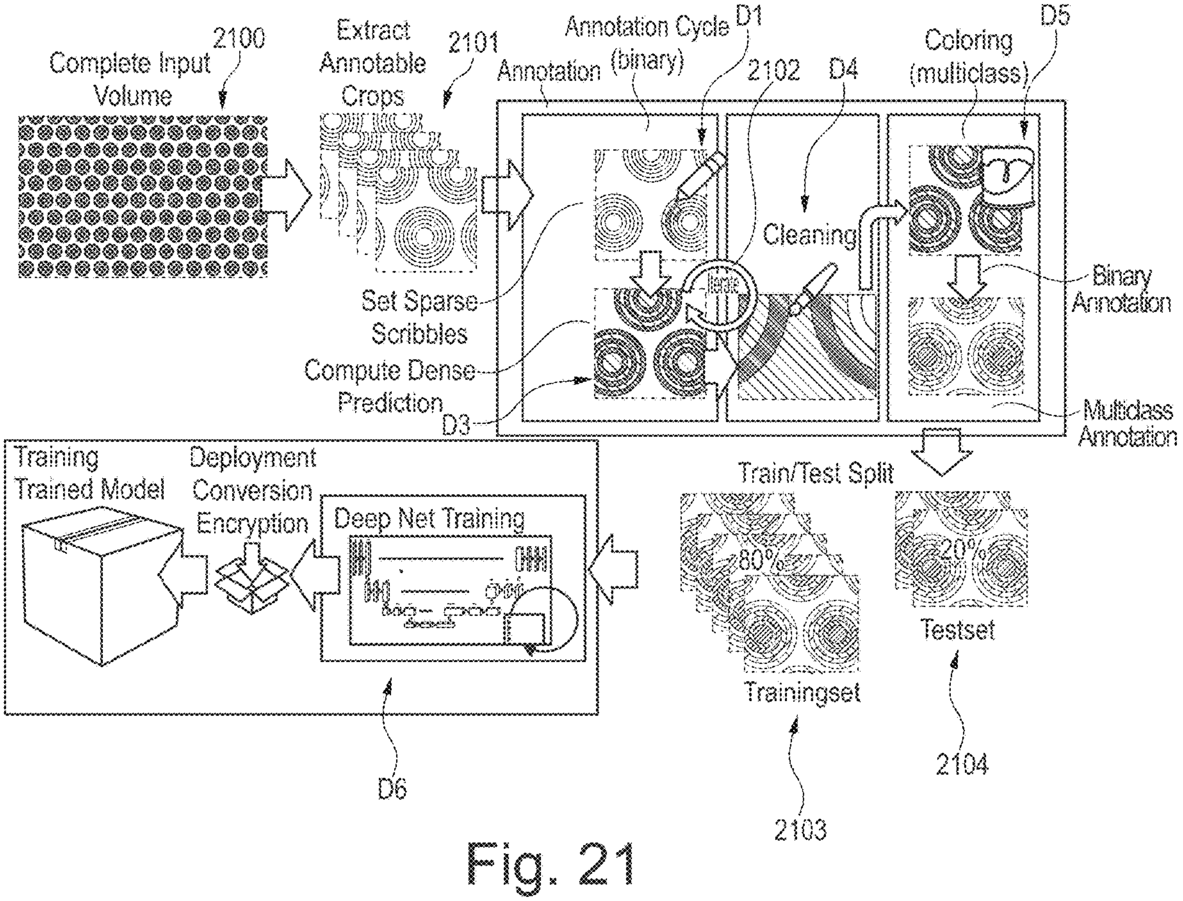
FIG. 21 further illustration of a method for training a machine learning logic.

As preliminary steps, as shown in FIG. 21, a complete input volume 2100 of cross-sectional images is provided, from which annotatable crops 2101 are extracted. Annotatable crops are sections of the input volume which have a reduced cross-section or area, to enable annotation for example by a human user via a corresponding interface.

Figure 20:
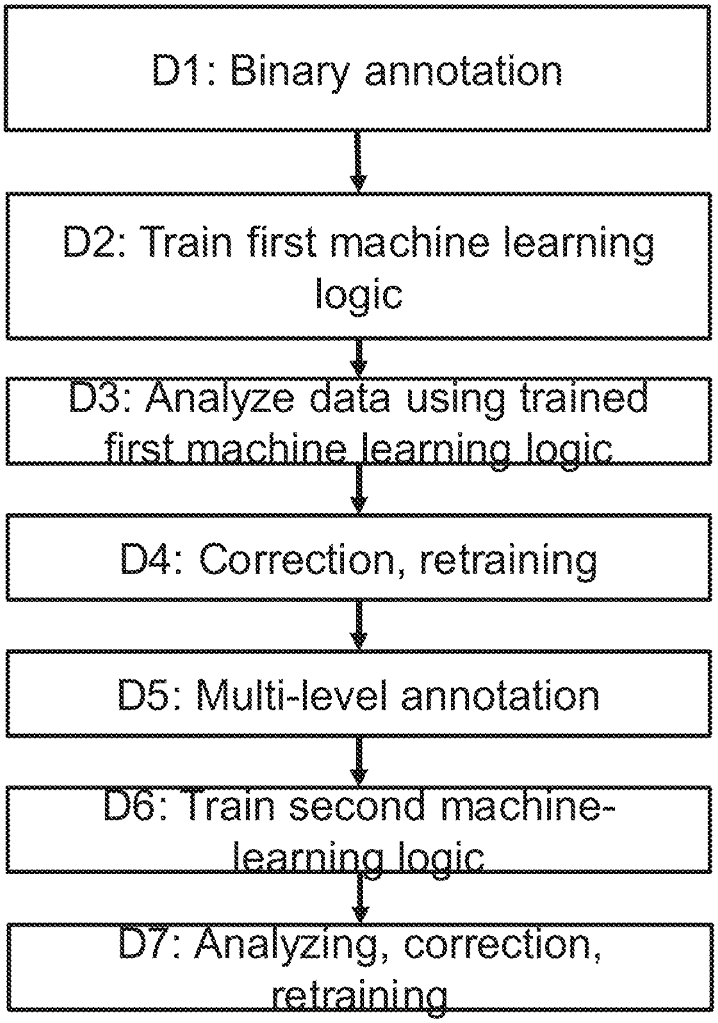
FIG. 20 illustration of a method for training a machine learning logic.

Then, the method of FIG. 20 starts with a binary annotation in step D1. In a binary annotation, the rings, which as explained above, have alternating brightness, are annotated with two alternating labels. This is symbolized in FIG. 21 by giving through two alternating hatchings to the rings. The annotation may be made only for some portions of each of the rings, which may be referred to as sparse scribbles.

With the thus created binary annotations, step D2 includes training a first machine learning logic. The first machine learning logic may be a comparatively simple model like a random forest model. In other words, the binary annotated rings from step D1 are provided to the first machine learning logic for training.

Step D3 of FIG. 20 then includes analyzing data of a larger volume, for example a larger part of the complete input volume 2100 of FIG. 21 or other images, using the trained first machine learning logic. This is symbolized in FIG. 21 by a plurality of rings being provided with the corresponding hatches by the trained first machine learning logic and is also referred to as computing a dense prediction in FIG. 21. Images analyzed by the trained first machine learning logic may be referred to as binary segmented images, as it segments rings with two alternating labels.

Next, in the method of FIG. 20, step D4 includes a correction of the analyzed data from step D3, which may also be referred to as cleaning in FIG. 21. Here, a user detects wrong classifications (wrong hatchings) provided by the machine learning logic. This may then be used for a retraining through one or more iterations, symbolized by a circular arrow 2102 in FIG. 21. Step D4 may be repeated several times to generate a segmentation of sufficient quality.

Once the desired quality of segmentation is achieved, in step D5, the method includes a multi-level annotation on an image segmented by the trained first machine learning logic. In other words, an image segmented using the trained first machine learning logic is now annotated to further distinguish different rings. This is symbolized in FIG. 21 by replacing the two different hatchings of the binary annotation with a plurality of different hatchings for different rings. In a user interface, this may be done by coloring rings or parts of the rings.

As the rings themselves have already been identified through the first machine learning logic, for example clicking on a single ring may give a label (for example hatching or color) to the complete ring easily. The crops 2101 thus provided with multi-level annotations in step D6 are then used for training a second machine learning logic. The second machine learning logic in some implementations may be a deep learning neural network. For this training, in some implementations, as shown in FIG. 21 the multi-level annotated crops may be separated into a training set 2103 and a test set 2104. For example, the training set may include about 80% of the multi-level annotated crops from step D5, and the test set 2104 may include about 20% of the annotated crops. The training set is then used for training, whereas the test set is used to check the quality of the training. For example, the crops of the test set are fed to the trained second machine learning logic without annotations, and the result is compared to the annotations.

Based on the quality of the annotations, similar to step D4 of the first machine learning logic, also here, in a step D7, after analyzing a correction and retraining may be performed, until the results have sufficient quality.

Then, as shown in FIG. 21, the trained neural network may be converted and encrypted for deployment, such that a trained model 2105 results. This trained model (trained machine learning logic) may then be used for preforming the pixel/voxel-based segmentation in step S5 of FIG. 5.

Figure 22:
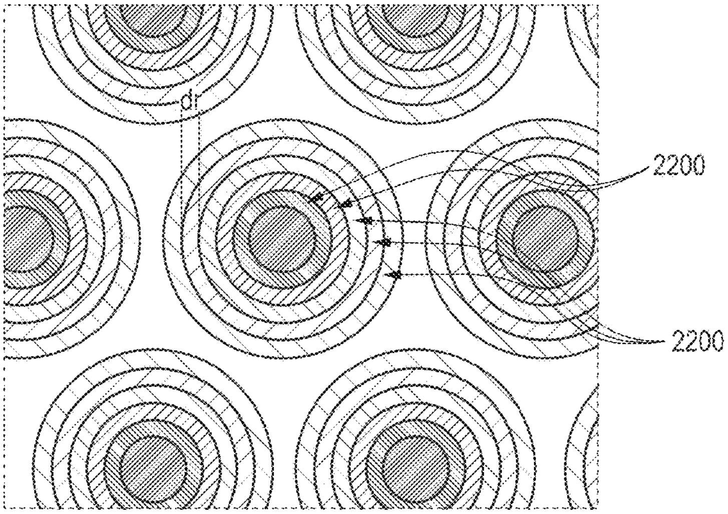
FIG. 22 a diagram of a 2D cross section of a memory channel with annotated sub structure.

As a result, as shown in FIG. 22, ring thicknesses dr and ring radii 2200 may be determined based on the segmentation with the trained second machine learning logic.

Figure 18:
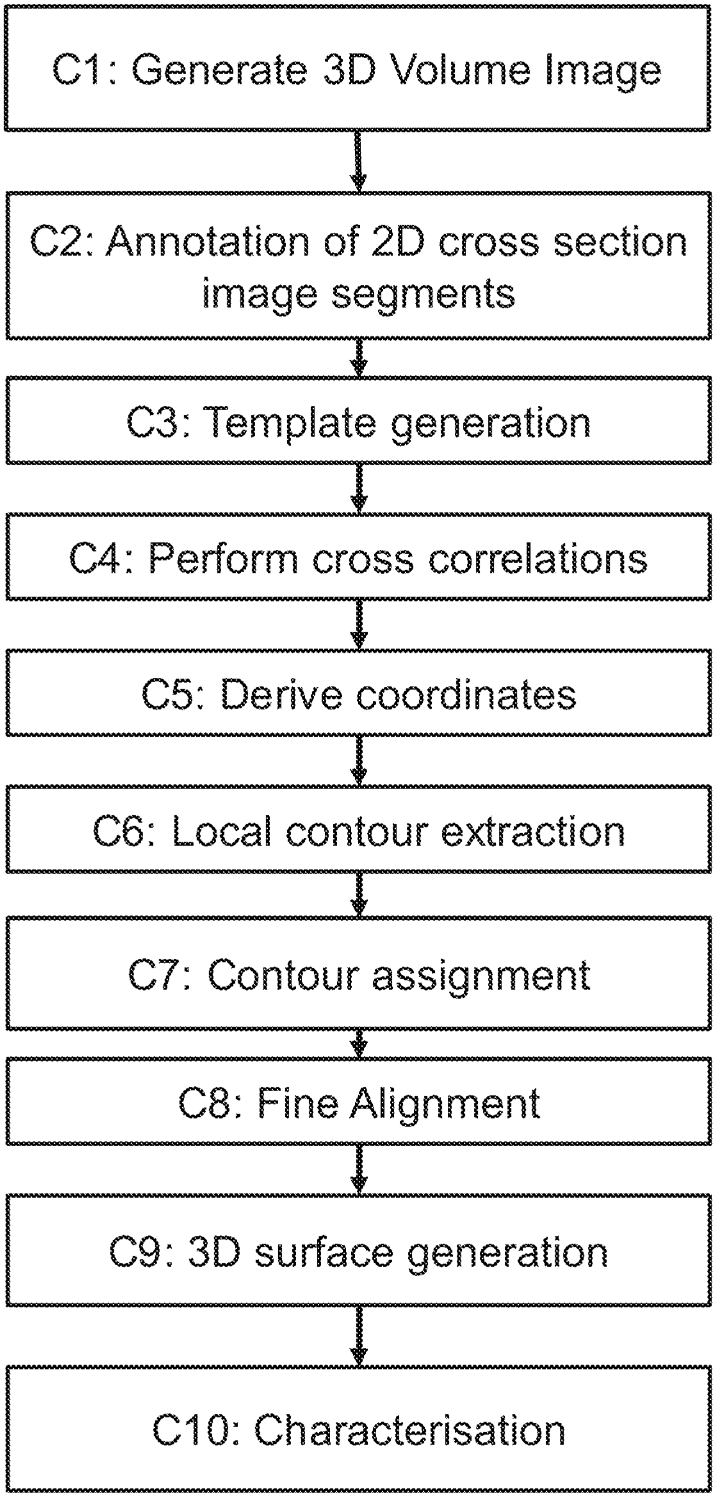
FIG. 18 shows an illustration of a method of wafer inspection including preparatory steps of an automated wafer inspection.

The computation of such quantitative parameters as shown if FIG. 22 based on the results of the segmentation may include an intermediate contour extraction step as will be explained further below with reference to FIG. 18. In such contour extraction steps, the contours may be extracted at the boundaries of the rings/layers determined with the segmentation. The contours may initially be placed at the boundaries of the segmented regions (rings) resulting from segmentation by the trained second machine learning logic. Active contour algorithms (snake algorithms) as for example described in Kass, M. et al, "Snakes: Active contour model", International Journal of Computer Vision. 1 (4): 321 may subsequently be used to refine/adjust the contours. Specifically, the contour vertices can be attracted towards maximum pixel gray value gradients of the original image in the vicinity of the initial contours. The resulting contours will thus mark a transition between the image regions characterized by different pixel gray values, e.g., between different "rings" of a memory channel. The active contour algorithm can also be applied on an image filled with probabilities of respective pixels belonging to their respective class (probability maps generated at the segmentation step). In this case, the contours will also mark a transition between different image regions but based on the classification confidence/probability provided by the trained model instead of the original pixel gray values. In some implementations, a "sub-pixel resolution" for the contours may be used, such that the image coordinates of the adjusted contour vortices may have floating point precision.

The generated segmentations or contours extracted based on the segmentation can be used to search for defects, for example substantial deviations of the ring shape, broken rings, substantive deviations from a nominal ring thickness or from nominal ring radii.

A method described above can be performed by dedicated computing systems capable of handling huge graphical data sets. A method of the disclosure is implemented as a computer program product and stored in an internal memory of the dedicated computing systems. A controller controls the operations of a microscope, such as the cross beam microscope 1, and transfer the image data generated by the microscope to a processing unit such as a graphics processor unit (GPU), the controller further controls to process the image data according to the method steps S2 to S8, the controller further controls to generate and store results in a memory devices (e.g., FLASH, random access memory (RAM), read only memory (ROM) or other suitable variants thereof). The controller is configured to operate the system according a computer program code automatically. The computer program code is embodied in a non-transitory computer readable medium and programmed to perform any number of the functions or algorithms as disclosed above. The computer program code is further configured that the controller from time to time informs a user via a graphics user interface (GUI), that a user input is desired. The controller sets the system in a wait state, until the user input is performed. Such user input can for example be the area selection of the z-series of 2D cross section images or the confirmation of the area selection of the z-series of 2D cross section images performed by an image processor. The results such as the deviation parameters stored in the memory devices are further output in step S9 in a standard output file format or via the graphical user interface.

In inspection or review applications, a large degree of automatization is used during the analysis of a 3D data stack, formed by a plurality of cross section image slices. In an embodiment of the disclosure, an automated workflow is provided for the 3D inspection of semiconductor wafer such as semiconductor wafers during the production of devices such as 3D memory chips (VNAND or 3D RAM). For example, 3D memory chips are composed of many pillar-like structures running parallel to each other and sometimes referred to as memory channels or "pillars". A sample containing such a 3D memory device can be studied by the cross-section imaging technique utilizing a FIB-SEM-microscope. The typical number of footprints of pillars in one slice can reach a few hundred up to 1000 or more. The typical stack of image slices can contain a few hundred images. In most applications, a large degree of automatization while reconstructing the pillars in 3D is used.

The typical number of footprints of pillars or other semiconductor structures in one image slice can reach a few hundred up to 1000 or more. The typical 3D data stack can contain a few hundred cross section images slices. A 3D stack of 2D cross section images can comprise therefore comprise more than 100.000 cross sections of pillars. On the other hand, each 2D image slice of 10 μm×10 μm with a resolution of below 2 nm can easily contain more than 5 gigapixel, or even more than 10 gigapixel. From this large amount of 3D volume image data, few parameters such as center position, radius and ellipticity of the about 100.000 cross sections of pillars are derived and about 500.000 numerical values are extracted. By analysis of the numerical values utilizing for example fitting algorithms and statistical methods a further reduction is achieved and significant performance indicators are provided. Examples of performance indicators are the maximum values of deviation parameter such as deviation in cross section area, the minimum distance between two pillars, a maximum tilt of a pillar within the plurality of pillars, and a maximum wiggling parameter of the plurality of pillars, and a descriptor of the variation of any of these parameters such as a statistical variance. According the embodiment of the automated workflow, up to several thousand of image cross sections of pillars or in general semiconductor structures are analyzed with high throughput. Details of the method according the embodiment will be described at the example of pillars or HAR structures in 3D memory chips, but the method is applicable in general for any types of semiconductors and wafers.

The method according the embodiment comprises several steps to reduce the data amount within a 3D volume image. In a first step of automatic detection of the pillar footprints in each of the slices and automatic generation of few descriptive parameters such as center position, best fit radius, ellipticity, the large amount of about M=10 Gigapixel or more is reduced to about N2=500.000 first numerical values. For example, a list of X- and Y-coordinates of the center coordinates located at the intersection of the pillars within the image slices is extracted. The first numerical values are analyzed, and from the center positions, for example a single tilt angle for each pillar is derived, and a reduction to about N3=10.000 second numerical values is achieved. The second numerical values are further processed by statistical methods and a further reduction to for example below 10 performance indicators is derived. A first example is using classical image processing techniques, and a second example utilizes machine learning based (ML-based) approaches. The method according the embodiment involves preparatory steps for an automated inspection of semiconductor devices.

An example of a workflow for wafer inspection comprises a reconstruction of semiconductor features which can be applied on a 3D volume image obtained with a FIB-SEM-microscope described above. An example comprises the preparatory steps for automated inspection using classical image processing techniques is illustrated in FIG. 18. In the first step C1, a representative 3D volume image data is generated, for example by a method according steps S1 and S2 as described above. During the step C1 of image acquisition, the 2D cross section image slices are aligned with respect to each other, for example at alignment fiducials or other methods of image alignment. Residual alignment errors or shifts between the adjacent 2D cross sections images are small and do not exceed a predetermined alignment threshold. Before step C1, a method can comprise further steps of loading a wafer on a wafer table, wafer alignment and registration, forming fiducial features on the wafer surface, generating of trenches with for example a FIB or a LASER beam, and lift out of at least one sample from the wafer, for example utilizing a probe needle, to which the sample is attached. It further can comprise steps of positioning the sample on a holder, which can be moved and positioned in the cross over of a FIB and a charged particle imaging device of a dual beam inspection device.

In preparative step C2 of annotation of 2D cross section image segments or footprints, for example pillar footprints of interest are annotated by an operator. One or more footprints are annotated by an operator to generate a template for the cross-correlation or to train an ML-bases object detector. During the annotation step, a user annotates interactively one or more footprints in one or more slices. In an example, the annotation is assisted by a graphical user interface, configured to for example display a rectangle or circle at positions selected by an operator with a computer mouse or other input devices over a display of a 2D cross section image. In an example, the annotation is assisted by image processing algorithms for footprint detection. Such algorithms can comprise filter operations, edged detection or contour extraction, or morphological operations. In an example, algorithms for footprint detection utilize previously obtained templates stored in a database to perform cross-correlation operations or machine learning ("ML") based object detectors to assist an operator to select cross section image segments of interest.

In step C3 or the step of template generation, a template of cross section image features representing a semiconductor structures of interest is generated. The template is for example an idealized cross section image feature, configured for a cross-correlation. In an example, a template or idealized cross section image feature is derived from the annotated footprints of step C2. For example, the annotated footprints of step C2 are automatically aligned and averaged. In addition, image processing techniques such as noise reduction or sharpening can be applied. The template is thus an image representing a "typical" or averaged footprint of a semiconductor structure of interest, for example of a HAR structure or pillar. During the generation of a template, a representative center position of a template is determined, and the template image is adjusted with respect to the representative center position. In an example, several semiconductor structures of interest are considered and the steps C2 and C3 are performed for several semiconductor structures of interest to generate at least a first template representing a first semiconductor structure of interest and a second template representing a semiconductor structure of interest.

In step C4, a series of cross-correlations is performed. A cross-correlation of the 2D cross section image slices with the template generated in step C3 is performed. Each peak in the resulting 2D cross-correlation images (one for each matching position of the template in each 2D cross section image slice) indicate a detected footprint or cross section of semiconductor structures of interest. To improve the sensitivity and/or the robustness of the footprint detection, the cross-correlation can be performed multiple times with different templates representing a first semiconductor structures of interest. An alteration of a template representing a first semiconductor structures of interest can for example be scaled using a series of scaling factors before each cross-correlation operation. In addition, different templates can be used for different cross section image slices or for example different z-positions in the 3D-volume image.

In step C5, a list footprint coordinates or center coordinates of the channel footprints is generated, corresponding to the footprints detected in Step C4 in each 2D image cross section image slice. The lateral coordinates are derived from the lateral or x-y-positions in the 2D image cross section image slice and the z-coordinate in the 3D volume image is derived from the z-position of the 2D image cross section image slice within the 3D volume. The center positions of the 2D cross section image features of the semiconductor structures of interest detected in the 2D cross section image slices in step C4 correspond to the representative center position of a template determined in step C3.

In step C6, the 2D cross sections image features representing the footprints are segmented, i.e. the boundaries of the footprints are determined. This is done "locally" for the individual footprints, i.e. using a plurality of 2D sub-images each containing only one footprint at a center position determined in step C5. The boundaries are computed using known algorithms for contour extraction, such as edge detection, morphological operations, thresholding or equivalent methods.

In the step C7, contours or boundaries determined in step C6 are assigned to semiconductor structures of interest, for example individual HAR structures or pillars. The boundaries or contours computed in step C6 belonging to the same pillar/channel in adjacent 2D cross section image slices are determined for example according their lateral center coordinates. As a result, for each semiconductor structures of interest, a list of contours/boundaries belonging to that semiconductor structures of interest in different 2D cross section image slices is generated.

The predetermined alignment threshold of step C1 can for example be the half of the distance between two neighboring footprints. In such case, any ambiguity in the assignment of contours to a corresponding semiconductor structures of interest is avoided. In an example, however, the identification and assignment of contours belonging to the same semiconductor structures of interest is not always possible. In this example, the contours of 2D cross section image features which cannot unambiguously assigned to a semiconductor structures of interest are flagged as ambiguous.

In step C8, the footprints belonging to the same semiconductor structures of interest which have been identified in different 2D cross section image slices in step C7 are analyzed and optionally the lateral alignment of the 2D cross section image slices with respect to each other is improved. For this purpose, a mean or average shift of all footprints in one 2D cross section image slice with respect to the corresponding footprints on an adjacent 2D cross section image slice is computed for all pairs of adjacent 2D cross section image slices. The computed shifts are then applied to the corresponding center coordinates of footprints. The result of step C8 is a set of lists, each list containing the corrected center positions and contours/boundaries belonging to a particular semiconductor structure of interest, for example a HAR channel or pillar.

In an example, the shifts are considered in a precision alignment in the 2D cross section image slices, and step C7 of assignment is repeated for the contours which have been flagged as ambiguous in step C7.

In step C9 (3D surface generation), for each channel the contour coordinates are extracted as X- Y- and Z-coordinates as the surface points located on the surface of a particular semiconductor-structure of interest. The surface points can also be combined into a primitive form, e.g. a triangular mesh or 3D polygon profile for the visualization or for further analysis. The large amount of surface or contour coordinates is thereby reduced to predetermined primitives or primitive forms described by a set of parameters, which represent the semiconductor structures of interest and their predetermined typical deviations from their ideal shape. Primitives can tilted or twisted cylinders with tilt angles and wiggling described by few parameters.

In step C10, a quantitative characterization of the semiconductor structures of interest is performed. For each semiconductor structures of interest, a set of parameters characterizing the geometry of the entire semiconductor structures of interest, for example a HAR structure or pillar is extracted or derived. Examples of such parameters are the averaged radius and ellipticity of a pillar as well as the dependences of parameters from the Z-coordinate, the inclination and curvature of a pillar's axis, proximity or closest distance between neighboring semiconductor structures of interest. The statistical properties of a large number of pillars (e.g., of all pillars in a data set) can be computed. Examples of such properties are the average radius of a set of pillars and its standard deviation, an average tilt of the pillars, an average proximity of the neighboring pillars, or the maximal and minimal values of a parameters over a plurality of pillars. Those skilled in the art may define a plurality of other statistical information representing performance indicators, for example suitable for a monitoring of a dedicated fabrication process step or suitable to determine the representative performance of the fabricated semiconductor device. The results of step C10 can also be correlated with other inspection measurements of other samples extracted from the same or a second wafer, or with the position on the wafer, from which the sample was prepared. Examples are for example a change of pillar cross section with depth, a tilt of pillars especially at the edges of wafers towards the outer circumference of a wafer, a variation of tilt angles over a wafer. Other examples are the shape of pillars, for example the average amount of a barrel-shape. The results, for example the representative primitives can also be compared to reference primitives obtained for example from CAD data of the design of the semiconductor device.

In an example of the embodiment, machine learning ("ML") based object detectors are applied. Instead of generating a template as described in step C3, in a modified step C3M the machine learning algorithm is trained with the annotated cross section image features identified during step C2. The machine learning algorithm is then applied in a modified step C4M for the automatic detection of cross section image features of the semiconductor structures of interest. This can be performed as described above, and the trained second machine learning logic may then be used both to detect the cross sections of the pillars in 2D cross-sections and their internal structure, i.e. segmentation into rings.

The method of inspection can also further comprise a modified step C6M utilizing local segmentation based on machine learning (ML). After the coordinates of the footprints are determined in a previous step, the boundaries or contours of the footprints are determined, and the footprints are segmented and separated from the background. This segmentation may be done with the trained second machine-learning logic mentioned above, to perform a segmentation into rings. The boundaries or contours can also be computed by using an ML-bases segmentation algorithm.

It is clear from the description above, that the steps C2 and C3 are preparatory steps and performed for preparing a routine inspection task. In a routine inspection task, steps C2 and C3 are omitted, and instead, a preselected set of templates, determined in a preparatory workflow and for example stored in a database, is utilized for steps C4 and further. It is also understood that during a routine inspection, the steps can overlap. For example, step C4 can overlap with step C1, and the identification of footprints by correlation with a template can start for example with the first 2D cross section image obtained during step C1. It is also possible that some process steps can be performed in changed order. For example, the step of C9 of 3D surface generation can for example be performed at a representative set of semiconductor structures of interest before step C8 of fine alignment, and the execution of the fine alignment according step C8 can be subject to a result of an analysis of the representative 3D surfaces. It is also possible that the step C8 of fine alignment is performed directly after step C5.

A method comprising any of steps C4 to C10 or comprising the modified steps C4M or C6M benefits from a faster computation time. In the method, in a first step, the amount of volume data of the 3D volume image is reduced by a factor of more than 10000 to the first numerical values. The first numerical values comprise lists of center positions and contour coordinates of semiconductor structures of interest, as obtained for example in step C5 to C7. The first numerical values are further reduced to the parameters of the representative primitive forms during step C9. Thereby, the number of first numerical values is further reduced to second numerical values by a factor of about 50. The method further benefits from statistical averaging, including a statistical averaging of step C9 during the generation of representative primitives.

The above examples are illustrated at the examples of HAR channels or pillars as semiconductor structures of interest. Other semiconductor structures of interest can be Vias in the logic probes. Vias are the vertical contacting structures between the adjacent horizontal layers of logic chips containing various IC-elements. Such vias can be handled in the same way as the HAR channels or pillars in the 3D memory probes. Other examples are metal lines or connections in the logic chips. A series of such metal lines which are known (e.g., from the available design information) to be parallel to each other can be handled in the same way as memory channels in the 3D-memory chips.

A method according to the disclosure can be applied in fabrication process characterization, fabrication process optimization or/and fabrication process monitoring for the process development or fabrication of semiconductor devices.

The above-described embodiments can be fully or partly combined with one another. Also, modifications or the method, the derived parameters or statistical values known by those skilled in the art possible within the scope of the disclosure. While the method according FIG. 5 is explained in sequence S1 to S7, the sequence of at least two method steps, such as the sequence of method step S2 and S3, can be exchanged.

LIST OF REFERENCE SIGNS

No. Item

1 cross beam microscope
2 cross section surface
3 cross section surface
4 cross section surface
Focused ion beam (FIB)
6 angle between CPB and FIB
7 charged particle beam (CPB)
8 scanning imaging lines of raster scan
9 ion beam
10 block shaped sample
11 cross section surface
18 2D cross section image
20 stack of 2D cross section images at distance dz, respectively
50 integrated semiconductor
51 Silicon substrate
52 top surface
54.1, 54.2, . . . 54.22, 54.1 . . . 54.*k* . . . 54.*z* planar layers of semiconductor device
55 via
56 metal structure
57 gate
58 doped structure
59 contact
60 pillars or HAR structures
62 pillar segments
63 thin gaps
64 trajectory of the pillar
66 outer circumference of the HAR structure
68.1, 68.2 groups of pillars
69 separating structure
70 inclination angle Θ
72.1 pillar segments
72.2 pillar segment with larger diameter
72.3 pillar segment with smaller diameter
74.1 inclined trajectory
74.2 non-linear trajectory
75 intersection plane
76.1 circumference of elliptical shape
76.2 circumference of general shape
78.1, 78.2 cross sections of pillars
79 cross section of group of pillars
80 an example of one identified pillar
82 circumference of the pillar 80
90.1, 90.2 pillar described by stack of circumferences
92 stack of circumferences
94 minimum distance vector between two circumferences
96 center of one pillar
97 displacement vector, or T(z) of one pillar
101.1, 101.2 cross sections
102.1, 102.2 inclusions or defects
103.1, 103.2 circumference of cross sections 101.1, 101.2
104.1, 104.2 the area of inclusions 102.1, 102.2
105 one pillar
106 core of a pillar
107 first, middle layer
108 second, outer layer
109.1, 109.2, 109.3 rows of pillars
110 Isolation layer
111 set of contours of a pillar
112 set of contours of a pillar
115 set of contours of pillar 105
116 extracted contour of core 106
117 extracted contour of first, middle layer 107
118 extracted contour of second, outer layer 108
1900 memory channel
1901 dielectric
1902 word line
2100 complete input volume
2101 annotatable crops
2102 arrow
2103 training set
2104 test set
S1-S8 method steps
C1-C10 method steps
D1-D7 method steps

What is claimed is:

1. A method, comprising:

using two alternating labels to binary annotate rings in cross section images of cross sections of pillars in high aspect ratio structures, thereby generating binary annotated rings;

training a first machine learning logic based on the binary annotated rings, wherein the first machine learning logic comprises a random forest model;

using the trained first machine learning logic to binary segment the cross section images of the cross sections of the pillars in the high aspect ratio structures or further cross section images of the cross sections of the pillars in the high aspect ratio structures, thereby generating binary segmented images that delineate individual ring regions;

re-training the first machine learning logic based on corrected binary segmented images;

multi-level annotating the individual ring regions as delineated in the binary segmented rings in the binary segmented images, thereby generating multi-level annotated images;

training a second machine learning logic as the machine-learning logic for segmenting rings based on a first part of the multi-level annotated images, wherein the second machine learning logic comprises a neural network; and testing the trained second machine learning logic based on a second part of the multi-level annotated images, wherein the second part of the multi-level annotated images is different from the first part of the multi-level annotated images.

2. The method of claim 1, wherein the first machine learning logic comprises a random forest model.

3. The method of claim 1, wherein the second machine learning logic comprises a neural network.

4. The method of claim 1, further comprising re-training the first machine learning logic based on corrected binary segmented images.

5. The method of claim 4, wherein multi-level annotating is performed after re-training.

6. The method claim 1, wherein:

training the second machine learning logic is based on a first part of the multi-level annotated images;

the method further comprises testing the trained second machine learning logic based on a second part of the multi-level annotated images; and the second part of the multi-level annotated images is different from the first part of the multi-level annotated images.

7. The method of claim 1, further comprising determining parameters of the rings based on the segmented rings.

8. The method of claim 7, further comprising identifying contours of the rings based on the segmented rings, wherein determining the parameters is based on the identified contours.

9. The method of claim 7, wherein the parameters comprise at least one member selected from the group consisting of ring radii and ring diameters.

10. The method of claim 7, further comprising identifying deviations of the parameters from nominal or intended values.

11. The method of claim 7, further comprising:

obtaining a three dimensional tomographic image of a semiconductor sample;

selecting a subset of two dimensional cross section image segments comprising a cross-section image of a pillar from the three dimensional tomographic image, each two dimensional cross section image segment comprising cross section images of a set of high aspect ratio structures;

identifying a contour of each high aspect ratio structure within the set of high aspect ratio structures in the subset of two dimensional cross section images;

extracting deviation parameters from the contours of the high aspect ratio structures of the set of high aspect ratio structures; and analyzing the deviation parameters, wherein the derivation parameters comprise at least one member selected from the group consisting of a displacement from an ideal position, a deviation in radius or diameter, a deviation from a cross section area, and a deviation from a shape of a cross section.

12. The method of 7, wherein analyzing the deviation parameters comprises performing statistical analysis of at least one deviation parameter of at least one high aspect ratio structure of the set of high aspect ratio structures.

13. A system, comprising:

one or more processing devices; and one or more machine-readable hardware storage devices comprising instructions that are executable by the one or more processing devices to perform operations comprising the method of claim 1.

14. The system of claim 13, further comprising:

a focused ion beam device configured to mill a series of cross sections of an integrated semiconductor sample; and a scanning electron beam microscope configured to image the series of cross sections of the integrated semiconductor sample.

15. The system of claim 14, further comprising a laser beam device configured to cut the integrated semiconductor sample from a wafer.

16. One or more machine-readable hardware storage devices comprising instructions that are executable by one or more processing devices to perform the method of claim 1.

17. The method of claim 1, wherein:

the binary segmented images are generated by the trained first machine learning logic performing a pixel-based segmentation of the cross section images; and each binary segmented image assigns, on a pixel-by-pixel basis, one of two alternating labels to each pixel, the two alternating labels distinguishing adjacent rings from one another in the cross section image.

* * * * *